(12) United States Patent
Flagstad et al.

(10) Patent No.: US 8,728,193 B2
(45) Date of Patent: May 20, 2014

(54) AIR FILTER ASSEMBLY; COMPONENTS THEREOF AND METHODS

(75) Inventors: Jordan S. Flagstad, E. Bethel, MN (US); Michael D. Carlson, Chanhassen, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 866 days.

(21) Appl. No.: 12/733,499

(22) PCT Filed: Sep. 5, 2008

(86) PCT No.: PCT/US2008/075426
§ 371 (c)(1),
(2), (4) Date: Aug. 5, 2010

(87) PCT Pub. No.: WO2009/033040
PCT Pub. Date: Mar. 12, 2009

(65) Prior Publication Data
US 2010/0293906 A1    Nov. 25, 2010

Related U.S. Application Data

(60) Provisional application No. 60/967,902, filed on Sep. 7, 2007.

(51) Int. Cl.
*B01D 46/00* (2006.01)

(52) U.S. Cl.
USPC ............ 55/498; 55/502; 55/520; 55/521; 55/DIG. 5; 55/326

(58) Field of Classification Search
USPC ............ 55/DIG. 28, DIG. 31, 490, 495, 497, 55/498, 520, 521, 529, 414, DIG. 5, 326; D23/365, 355; 156/191
See application file for complete search history.

(56) References Cited

U.S. PATENT DOCUMENTS 2,038,071 A * 4/1936 Wilhelm .................. 96/118
(Continued)

FOREIGN PATENT DOCUMENTS

| DE | 1 094 108 | 1/1957 |
|---|---|---|
| DE | 10 2004 058 590 | 8/2006 |

(Continued)

OTHER PUBLICATIONS

Pending Claims in U.S. Appl. No. 12/449,809 dated May 6, 2013.

*Primary Examiner* — Duane Smith
*Assistant Examiner* — Sonji Turner
(74) *Attorney, Agent, or Firm* — Merchant & Gould P.C.

(57) ABSTRACT

An air filter cartridge arrangement, an air cleaner assembly, and components therefor, are provided. The air filter cartridge generally has perimeter shape with a straight side and an opposite arched side. The filter cartridge includes a media pack comprising strips of single facer material, each strip comprising fluted sheet secured to a facing sheet. In an example depicted, arch-shaped sections of single facer material are nested within one another, to form media pack having a perimeter D-shape. An air cleaner assembly configured for receipt of filter cartridge is described. A particular assembly, convenient for mounting on the cowl, cowling or engine cover of an over-the-highway truck, is provided.

20 Claims, 20 Drawing Sheets

(56) References Cited

U.S. PATENT DOCUMENTS

| | | | |
|---|---|---|---|
| 3,025,963 A * | 3/1962 | Bauer | 210/493.4 |
| 3,076,554 A * | 2/1963 | Bub | 210/487 |
| 3,831,355 A * | 8/1974 | Mugford | 55/484 |
| 3,966,646 A * | 6/1976 | Noakes et al. | 502/439 |
| 4,410,427 A | 10/1983 | Wydeven | |
| 4,430,223 A * | 2/1984 | Miyakawa et al. | 210/493.5 |
| 4,589,983 A | 5/1986 | Wydevan | |
| 4,600,421 A | 7/1986 | Kummann | |
| 4,613,438 A * | 9/1986 | DeGraffenreid | 210/323.1 |
| 4,715,954 A * | 12/1987 | DeGraffenreid | 210/323.1 |
| 4,749,485 A * | 6/1988 | DeGraffenreid | 210/323.1 |
| 5,613,992 A | 3/1997 | Engel et al. | |
| 5,622,583 A | 4/1997 | Ernst et al. | |
| 5,772,883 A | 6/1998 | Rothman et al. | |
| D396,098 S | 7/1998 | Gillinghame et al. | |
| 5,792,247 A | 8/1998 | Gillingham et al. | |
| D398,046 S | 9/1998 | Gillingham et al. | |
| D399,944 S | 10/1998 | Gillingham et al. | |
| 5,820,646 A | 10/1998 | Gillingham et al. | |
| 5,895,574 A | 4/1999 | Friedmann et al. | |
| 5,902,364 A | 5/1999 | Tokar et al. | |
| 6,039,778 A | 3/2000 | Coulonvaux et al. | |
| D428,128 S | 7/2000 | Gillingham et al. | |
| 6,179,890 B1 | 1/2001 | Ramos et al. | |
| D437,401 S | 2/2001 | Ramos et al. | |
| 6,190,432 B1 | 2/2001 | Gieseke et al. | |
| 6,210,469 B1 | 4/2001 | Tokar et al. | |
| 6,235,195 B1 | 5/2001 | Tokar et al. | |
| 6,350,291 B1 | 2/2002 | Gieseke et al. | |
| 6,350,296 B1 | 2/2002 | Warner | |
| 6,673,136 B2 * | 1/2004 | Gillingham et al. | 95/273 |
| 6,743,317 B2 | 6/2004 | Wydeven | |
| 7,004,986 B2 | 2/2006 | Kopec | |
| 7,008,467 B2 | 3/2006 | Krisko | |
| 7,351,270 B2 | 4/2008 | Engelland et al. | |
| 7,481,863 B2 | 1/2009 | Oelpke | |
| 7,569,090 B2 * | 8/2009 | Nelson | 55/502 |
| 7,648,545 B2 | 1/2010 | Amesoeder | |
| 7,666,520 B2 * | 2/2010 | Wieres et al. | 428/593 |
| 7,670,402 B2 | 3/2010 | Miller | |
| 7,678,170 B2 | 3/2010 | Pfeiffer et al. | |
| 7,708,796 B2 | 5/2010 | Rieger et al. | |
| 7,997,425 B2 | 8/2011 | Golden et al. | |
| 8,034,145 B2 | 10/2011 | Boehrs et al. | |
| 8,167,965 B2 | 5/2012 | Greif | |
| 8,172,918 B2 | 5/2012 | Grosche et al. | |
| 8,206,479 B2 | 6/2012 | Nepsund et al. | |
| 8,216,332 B2 | 7/2012 | Kopec et al. | |
| 8,216,334 B2 | 7/2012 | Nelson et al. | |
| 8,241,383 B2 | 8/2012 | Schrage et al. | |
| 8,277,532 B2 | 10/2012 | Reichter et al. | |
| 8,328,022 B2 | 12/2012 | Mbadinga-Mouanda et al. | |
| 8,349,049 B2 | 1/2013 | Amesoder et al. | |
| 8,382,876 B2 | 2/2013 | Widerski et al. | |
| 2002/0096247 A1 | 7/2002 | Wydeven et al. | |
| 2004/0035096 A1 | 2/2004 | Ham | |
| 2006/0081528 A1 | 4/2006 | Oelpke et al. | |
| 2006/0107640 A1 * | 5/2006 | Nelson | 55/498 |
| 2006/0123754 A1 | 6/2006 | Oelpke et al. | |
| 2006/0130659 A1 | 6/2006 | Durst et al. | |
| 2006/0260285 A1 | 11/2006 | Pfeiffer et al. | |
| 2007/0137157 A1 | 6/2007 | Linhart et al. | |
| 2007/0261662 A1 | 11/2007 | Lampert et al. | |
| 2008/0213614 A1 * | 9/2008 | Wieres et al. | 428/593 |
| 2010/0011725 A1 | 1/2010 | Babb et al. | |
| 2010/0018175 A1 * | 1/2010 | Nelson | 55/502 |
| 2010/0064643 A1 | 3/2010 | Greif | |
| 2010/0146919 A1 | 6/2010 | Nelson et al. | |
| 2010/0154368 A1 | 6/2010 | Kopec | |
| 2010/0162673 A1 | 7/2010 | Grosche | |
| 2010/0170211 A1 | 7/2010 | Vaillant et al. | |
| 2011/0099961 A1 | 5/2011 | Amesoeder et al. | |
| 2011/0247582 A1 | 10/2011 | Blossey et al. | |
| 2012/0223008 A1 | 9/2012 | Mbadinga-Mouanda et al. | |
| 2012/0223009 A1 | 9/2012 | Mbadinga-Mouanda et al. | |
| 2012/0279186 A1 | 11/2012 | Heim et al. | |

FOREIGN PATENT DOCUMENTS

| | | |
|---|---|---|
| EP | 1 905 497 B1 | 7/2007 |
| WO | 2004/020075 | 3/2004 |
| WO | WO 2006/009766 | 1/2006 |
| WO | 2011/082933 | 7/2011 |

\* cited by examiner

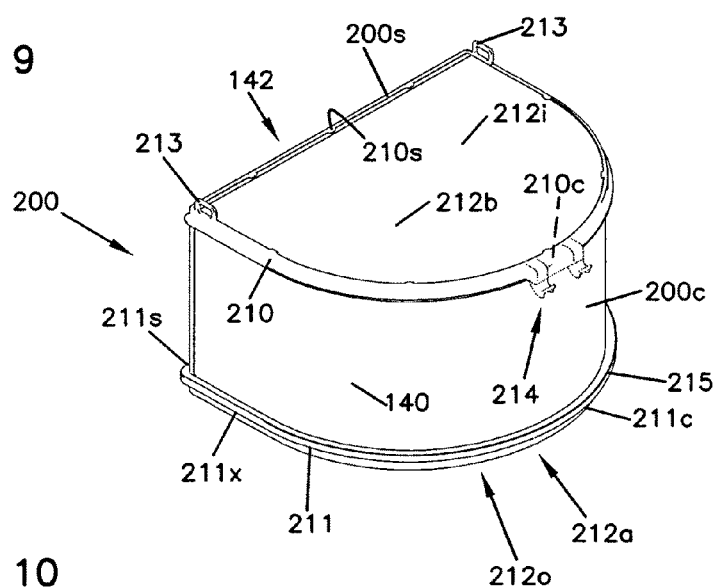
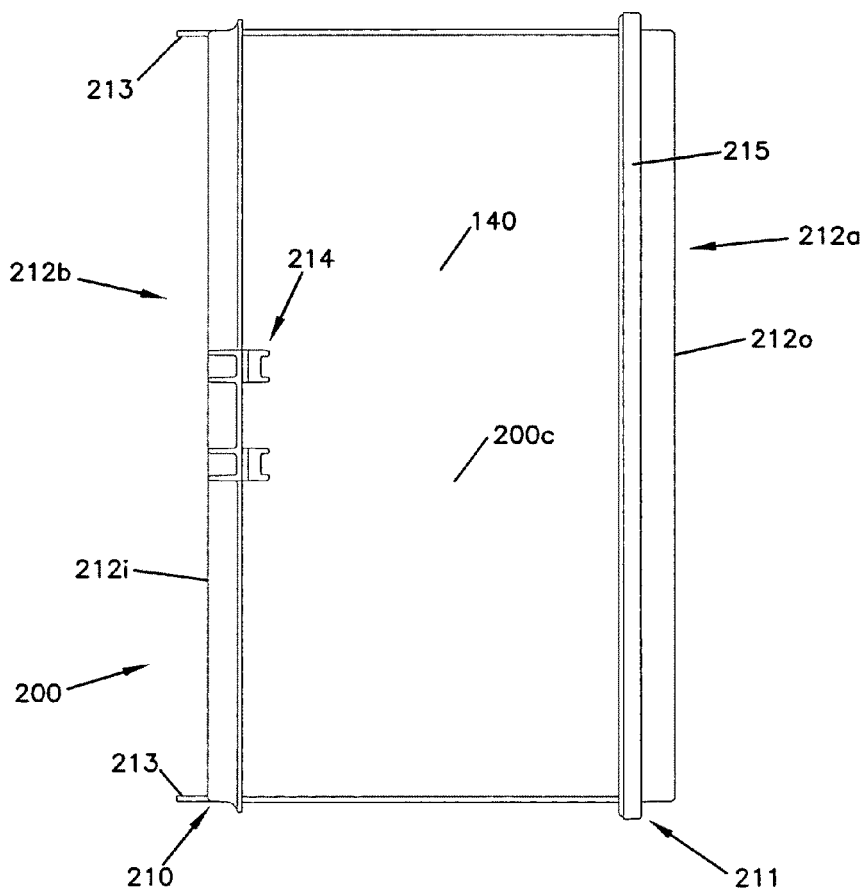

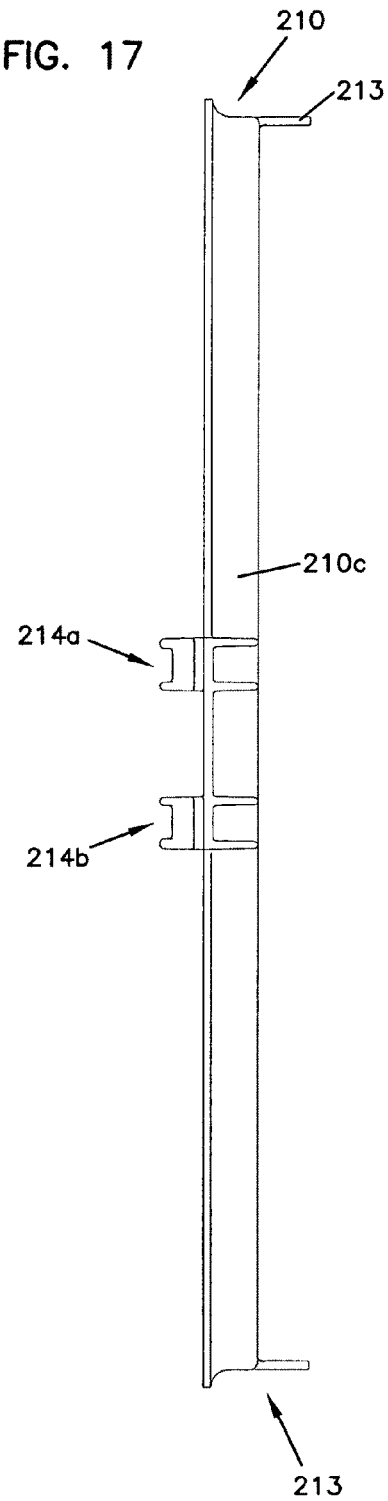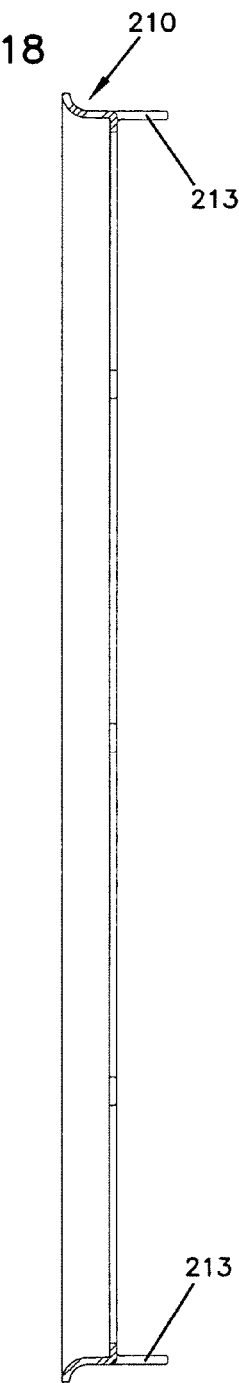

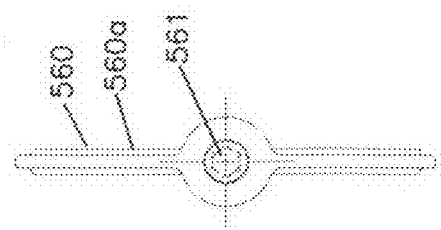
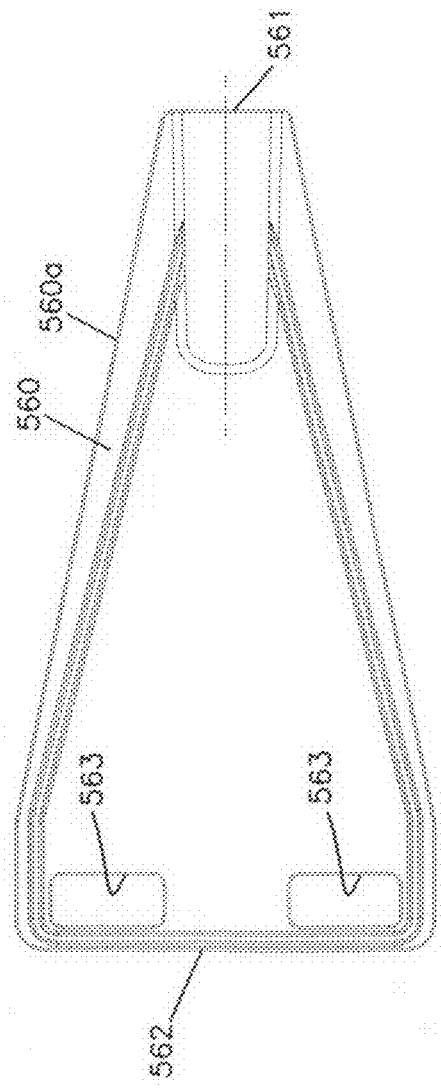

US 8,728,193 B2

AIR FILTER ASSEMBLY; COMPONENTS THEREOF AND METHODS

This application is being filed on 3 Mar. 2010, as a US National Stage of PCT International Patent application No. PCT/US2008/075426, filed 5 Sep. 2008. A claim of priority to PCT/US2008/075426 is made. PCT/US2008/075426 includes a claim of priority to U.S. Ser. No. 60/967,902 filed Sep. 7, 2007. Here, a claim of priority to U.S. Provisional patent application Ser. No. 60/967,902, filed Sep. 7, 2007 is made to the extent appropriate. Each of PCT/US2008/075426 and U.S. Ser. No. 60/967,902 is incorporated herein by reference.

FIELD OF THE DISCLOSURE

The present disclosure concerns air cleaners for use, for example, for cleaning engine combustion air for vehicles and other equipment. The disclosure provides preferred components, assemblies and methods.

BACKGROUND

Gas streams often carry particulate material therein. In many instances it is desirable to remove some or all of the particulate material from the gas flow stream. For example, air intake streams to engines for motorized vehicles or power generation equipment often include particulate material therein. The particulate material, should it reach the internal workings of the mechanisms involved, can cause substantial damage. It is therefore preferred, for such systems, to remove the particulate material from the gas flow upstream of the engine or other equipment involved. A variety of air cleaner arrangements have been developed for particulate removal.

There has been a general trend for the utilization of air cleaner arrangements that utilize, as a media pack, z-filter media constructions. In general, z-filter media constructions can be characterized as comprising fluted media sheet material secured to a facing media sheet material, formed into a media pack configuration. Examples of z-filter arrangements are described in PCT Publication WO 97/40918, published Nov. 6, 1997; U.S. Pat. Nos. 6,190,432 and 6,350,291; PCT application US 04/07927, filed Mar. 17, 2004; U.S. Provisional application 60/532,783, filed Dec. 22, 2003; PCT Publication 03/095068, published Nov. 20, 2003; PCT publication WO 04/007054, published Jan. 22, 2004 and; PCT publication WO 03/084641, published Oct. 16, 2003. The complete disclosures of each of these cited references is incorporated herein by reference.

As advantages related to z-filter media constructions are more widely recognized, applications of the technology in a variety of alternate configurations for alternate applications are desired.

SUMMARY OF THE DISCLOSURE

The present disclosure concerns air cleaners and componentry therefor. A variety of assembly features and component features are described, for air cleaners and their components, including serviceable filter cartridges. Example features described herein relate to features of a filter cartridge concerning a particular perimeter shape, i.e. a shape with a straight side and an opposite arch-shaped side, typically providing a "D" perimeter shape. Assembly features relate to features for advantageous for mounting an air cleaner assembly on the side or cowling, i.e. engine cover, of a vehicle such as an over the highway truck.

It is noted that not all the specific features described herein need to be incorporated in an arrangement for the arrangement to have some selected advantage according to the present disclosure.

BRIEF DESCRIPTION OF THE DRAWINGS

FIG. 9 is schematic, perspective view of a filter cartridge including the media pack of FIG. 8.

FIG. 10 is schematic side plan view of filter cartridge in FIG. 9; the view of FIG. 9 being directed toward an arch-shaped side.

FIG. 17 is a schematic, side elevational view of the bracket of FIG. 16.

FIG. 18 is a schematic, cross-sectional view taken along line 18-18, FIG. 16.

FIG. 28 is a schematic plan view of the retainer piece of a assembly of FIG. 16.

FIG. 29 is a schematic end view of the retainer piece of FIG. 28.

DETAILED DESCRIPTION

I. Z-Filter Media Configurations, Generally

Figure 1:
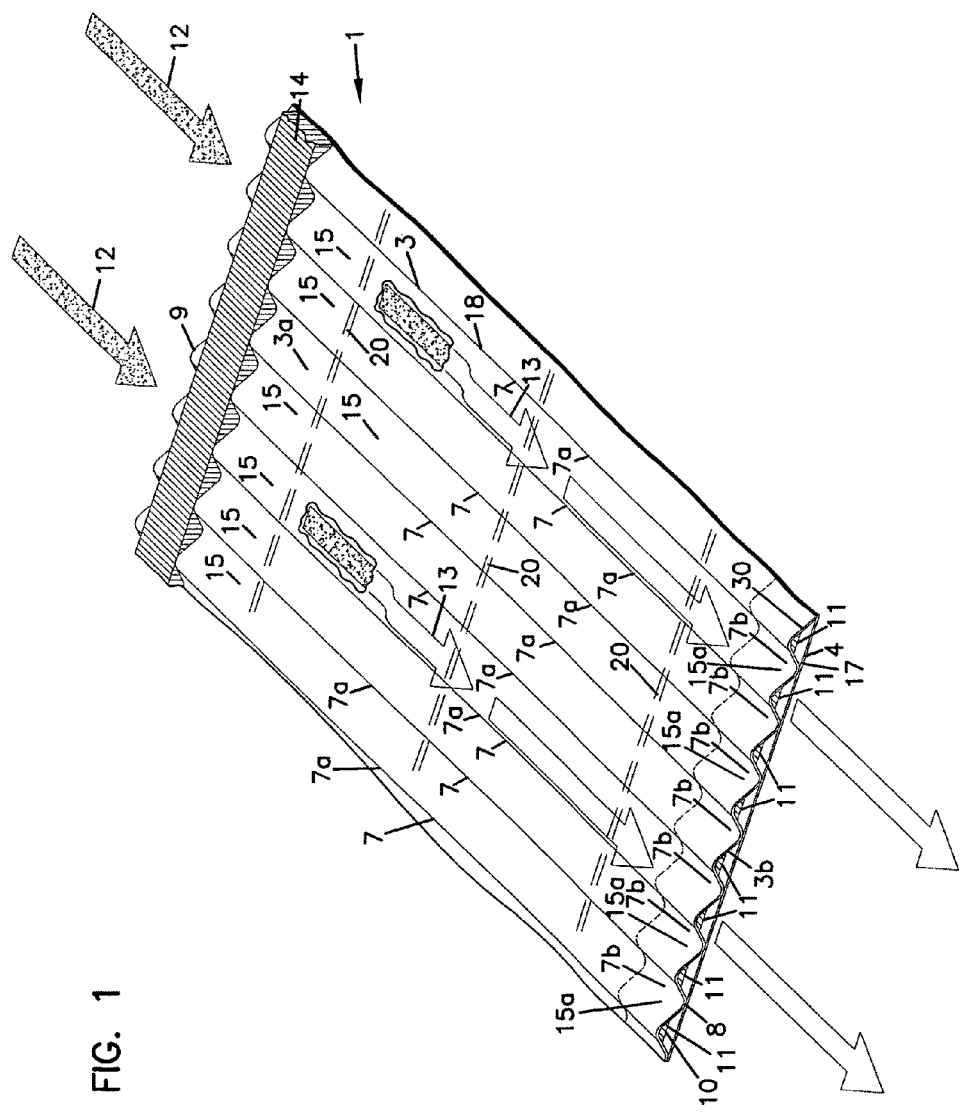
FIG. 1 is a fragmentary, schematic, perspective view of a single facer strip of z-filter media comprising a fluted sheet secured into a facing sheet.

Fluted filter media can be used to provide fluid filter constructions in a variety of manners. One well known manner is as a z-filter construction. The term "z-filter construction" as used herein, is meant to refer to a filter construction in which individual ones of corrugated, folded or otherwise formed filter flutes are used to define sets of longitudinal filter flutes for fluid flow through the media; the fluid flowing along the length of the flutes between opposite inlet and outlet flow ends (or flow faces) of the media. Some examples of z-filter media are provided in U.S. Pat. Nos. 5,820,646; 5,772,883; 5,902,364; 5,792,247; 5,895,574; 6,210,469; 6,190,432; 6,350,296; 6,179,890; 6,235,195; Des. No. 399,944; Des. No. 428,128; Des. No. 396,098; Des. No. 398,046; and, Des. No. 437,401; each of these fifteen cited references being incorporated herein by reference.

One type of z-filter media utilizes two specific media components joined together, to form the media construction. The two components are: (1) a fluted (typically corrugated) media sheet; and, (2) a facing media sheet. The facing media sheet is typically non-corrugated, however it can be corrugated, for example perpendicularly to the flute direction as described in U.S. provisional 60/543,804, filed Feb. 11, 2004, incorporated herein by reference.

The fluted (typically corrugated) media sheet and the facing media sheet, together, are used to define media having parallel inlet and outlet flutes; i.e. opposite sides of the fluted sheet operable as inlet and outlet flow regions. In some instances, the fluted sheet and non-fluted sheet are secured together and are then coiled to form a z-filter media construction. Such arrangements are described, for example, in U.S. Pat. Nos. 6,235,195 and 6,179,890, each of which is incorporated herein by reference. In certain other arrangements, some non-coiled sections of fluted media secured to flat media, are stacked on one another, to create a filter construction. An example of this is described in FIG. 11 of U.S. Pat. No. 5,820,646, incorporated herein by reference.

Typically, coiling of the fluted sheet/facing sheet combination around itself, to create a coiled media pack, is conducted with the facing sheet directed outwardly. Some techniques for coiling are described in U.S. provisional application 60/467, 521, filed May 2, 2003 and PCT Application US 04/07927, filed Mar. 17, 2004, published Sep. 30, 2004 as WO 2004/ 082795, incorporated herein by reference. The resulting coiled arrangement generally has, as the outer surface of the media pack, a portion of the facing sheet, as a result. In some instances a protective covering can be provided around the media pack.

The term "corrugated" when used herein to refer to structure in media, is meant to refer to a flute structure resulting from passing the media between two corrugation rollers, i.e., into a nip or bite between two rollers, each of which has surface features appropriate to cause a corrugation affect in the resulting media. The term "corrugation" is not meant to refer to flutes that are formed by techniques not involving passage of media into a bite between corrugation rollers. However, the term "corrugated" is meant to apply even if the media is further modified or deformed after corrugation, for example by the folding techniques described in PCT WO 04/007054, published Jan. 22, 2004, incorporated herein by reference.

Corrugated media is a specific form of fluted media. Fluted media is media which has individual flutes (for example formed by corrugating or folding) extending thereacross.

Serviceable filter element or filter cartilage configurations utilizing z-filter media are sometimes referred to as "straight through flow configurations" or by variants thereof. In general, in this context what is meant is that the serviceable filter elements generally have an inlet flow end (or face) and an opposite exit flow end (or face), with flow entering and exiting the filter cartridge in generally the same straight through direction. (The term "straight through flow configuration" disregards, for this definition, any air flow that passes out of the media pack through the outermost wrap of facing media.) The term "serviceable" in this context is meant to refer to a media containing filter cartridge that is periodically removed and replaced from a corresponding air cleaner. In some instances, each of the inlet flow end and outlet flow end will be generally flat or planar, with the two parallel to one another. However, variations from this, for example non-planar faces are possible.

In general, the media pack includes appropriate seal material therein, to ensure there is no unfiltered flow of air through the media pack, in extension from front flow face (an inlet flow face) completely through and outwardly from opposite oval face (outlet flow face).

A straight through flow configuration (especially for a coiled media pack) is, for example, in contrast to serviceable filter cartridges such as cylindrical pleated filter cartridges of the type shown in U.S. Pat. No. 6,039,778, incorporated herein by reference, in which the flow generally makes a turn as its passes through the serviceable cartridge. That is, in a U.S. Pat. No. 6,039,778 filter, the flow enters the cylindrical filter cartridge through a cylindrical side, and then turns to exit through an end face (in forward-flow systems). In a typical reverse-flow system, the flow enters the serviceable cylindrical cartridge through an end face and then turns to exit through a side of the cylindrical filter cartridge. An example of such a reverse-flow system is shown in U.S. Pat. No. 5,613,992, incorporated by reference herein.

The term "z-filter media construction" and variants thereof as used herein, without more, is meant to refer to any or all of: a web of corrugated or otherwise fluted media secured to (facing) media with appropriate sealing to inhibit air flow from one flow face to another without filtering passage through the filter media; and/or, such a media coiled or otherwise constructed or formed into a three dimensional network of flutes; and/or, a filter construction including such media. In many arrangements, the z-filter media construction is configured for the formation of a network of inlet and outlet flutes, inlet flutes being open at a region adjacent an inlet face and being closed at a region adjacent an outlet face; and, outlet flutes being closed adjacent an inlet face and being open adjacent an outlet face. However, alternative z-filter media arrangements are possible, see for example US 2006/ 0091084 A1, published May 4, 2006, incorporated herein by reference; also comprising flutes extending between opposite flow faces, with a seal arrangement to prevent flow of unfiltered air through the media pack.

In FIG. 1 herein, an example of media 1 useable in z-filter media is shown. The media 1 is formed from a fluted (corrugated) sheet 3 and a facing sheet 4. Herein, a strip of media comprising fluted sheet secured to facing sheet will sometimes be referred to as a single facer strip, or by similar terms.

In general, the corrugated sheet 3, FIG. 1 is of a type generally characterized herein as having a regular, curved, wave pattern of flutes or corrugations 7. The term "wave pattern" in this context, is meant to refer to a flute or corrugated pattern of alternating troughs 7b and ridges 7a. The term "regular" in this context is meant to refer to the fact that the pairs of troughs and ridges (7b, 7a) alternate with generally the same repeating corrugation (or flute) shape and size. (Also, typically in a regular configuration each trough 7b is substantially an inverse of each ridge 7a.) The term "regular" is thus meant to indicate that the corrugation (or flute) pattern comprises troughs and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet 3 is flexible. With respect to the characterization of a repeating pattern, it is not meant that in any given filter construction, an equal number of ridges and troughs is necessarily present. The media 1 could be terminated, for example, between a pair comprising a ridge and a trough, or partially along a pair comprising a ridge and a trough. (For example, in FIG. 1 the media 1 depicted in fragmentary has eight complete ridges 7a and seven complete troughs 7b.) Also, the opposite flute ends (ends of the troughs and ridges) may vary from one another. Such variations in ends are disregarded in these definitions, unless specifically stated. That is, variations in the ends of flutes are intended to be covered by the above definitions.

In the context of the characterization of a "curved" wave pattern of corrugations, the term "curved" is meant to refer to a corrugation pattern that is not the result of a folded or creased shape provided to the media, but rather the apex 7a of each ridge and the bottom 7b of each trough is formed along a radiused curve. Although alternatives are possible, a typical radius for such z-filter media would be at least 0.25 mm and typically would be not more than 3 mm. (Media that is not curved, by the above definition, can also be useable.)

An additional characteristic of the particular regular, curved, wave pattern depicted in FIG. 1, for the corrugated sheet 3, is that at approximately a midpoint 30 between each trough and each adjacent ridge, along most of the length of the flutes 7, is located a transition region where the curvature inverts. For example, viewing back side or face 3a, FIG. 1, trough 7b is a concave region, and ridge 7a is a convex region. Of course when viewed toward front side or face 3b, trough 7b of side 3a forms a ridge; and, ridge 7a of face 3a, forms a trough. (In some instances, region 30 can be a straight segment, instead of a point, with curvature inverting at ends of the segment 30.)

A characteristic of the particular regular, curved, wave pattern corrugated sheet 3 shown in FIG. 1, is that the individual corrugations are generally straight. By "straight" in this context, it is meant that through at least 70% (typically at least 80%) of the length between edges 8 and 9, the ridges 7a and troughs 7b do not change substantially in cross-section. The term "straight" in reference to corrugation pattern shown in FIG. 1, in part distinguishes the pattern from the tapered flutes of corrugated media described in FIG. 1 of WO 97/40918 and PCT Publication WO 03/47722, published Jun. 12, 2003, incorporated herein by reference. The tapered flutes of FIG. 1 of WO 97/40918, for example, would be a curved wave pattern, but not a "regular" pattern, or a pattern of straight flutes, as the terms are used herein.

Referring to the present FIG. 1 and as referenced above, the media 1 has first and second opposite edges 8 and 9. When the media 1 is coiled and formed into a media pack, in general edge 9 will form an inlet end for the media pack and edge 8 an outlet end, although an opposite orientation is possible.

In the example shown, adjacent edge 8 is provided sealant, in this instance in the form of a sealant bead 10, sealing the corrugated (fluted) sheet 3 and the facing sheet 4 together. Bead 10 will sometimes be referred to as a "single facer" bead, since it is a bead between the corrugated sheet 3 and facing sheet 4, which forms the single facer or media strip 1. Sealant bead 10 seals closed individual flutes 11 adjacent edge 8, to passage of air therefrom.

In the example shown, adjacent edge 9, is provided sealant, in this instance in the form of a seal bead 14. Seal bead 14 generally closes flutes 15 to passage of unfiltered fluid therein, adjacent edge 9. Bead 14 would typically be applied as the media 1 is coiled about itself, with the corrugated sheet 3 directed to the inside. Thus, bead 14 will form a seal between a back side 17 of facing sheet 4, and side 18 of the corrugated sheet 3. The bead 14 will sometimes be referred to as a "winding bead" since it is typically applied, as the strip 1 is coiled into a coiled media pack. If the media 1 is cut in strips and stacked, instead of coiled, bead 14 would be a "stacking bead."

Referring to FIG. 1, once the media 1 is incorporated into a media pack, for example by coiling or stacking, it can be operated as follows. First, air in the direction of arrows 12, would enter open flutes 11 adjacent end 9. Due to the closure at end 8, by bead 10, the air would pass through the media shown by arrows 13. It could then exit the media pack, by passage through open ends 15a of the flutes 15, adjacent end 8 of the media pack. Of course operation could be conducted with air flow in the opposite direction.

In more general terms, z-filter media comprises fluted filter media secured to facing filter media, and configured in a media pack of flutes extending between first and second opposite flow faces. A sealant arrangement is provided within the media pack, to ensure that air entering flutes at a first upstream edge cannot exit the media pack from a downstream edge, without filtering passage through the media.

For the particular arrangement shown herein in FIG. 1, the parallel corrugations 7a, 7b are generally straight completely across the media, from edge 8 to edge 9. Straight flutes or corrugations can be deformed or folded at selected locations, especially at ends. Modifications at flute ends for closure are generally disregarded in the above definitions of "regular," "curved" and "wave pattern."

Z-filter constructions which do not utilize straight, regular curved wave pattern corrugation (flute) shapes are known. For example in Yamada et al. U.S. Pat. No. 5,562,825 corrugation patterns which utilize somewhat semicircular (in cross section) inlet flutes adjacent narrow V-shaped (with curved sides) exit flutes are shown (see FIGS. 1 and 3, of U.S. Pat. No. 5,562,825). In Matsumoto, et al. U.S. Pat. No. 5,049,326 circular (in cross-section) or tubular flutes defined by one sheet having half tubes attached to another sheet having half tubes, with flat regions between the resulting parallel, straight, flutes are shown, see FIG. 2 of Matsumoto '326. In Ishii, et al. U.S. Pat. No. 4,925,561 (FIG. 1) flutes folded to have a rectangular cross section are shown, in which the flutes taper along their lengths. In WO 97/40918 (FIG. 1), flutes or parallel corrugations which have a curved, wave patterns (from adjacent curved convex and concave troughs) but which taper along their lengths (and thus are not straight) are shown. Also, in WO 97/40918 flutes which have curved wave patterns, but with different sized ridges and troughs, are shown.

In general, the filter media is a relatively flexible material, typically a non-woven fibrous material (of cellulose fibers, synthetic fibers or both) often including a resin therein, sometimes treated with additional materials. Thus, it can be conformed or configured into the various corrugated patterns, without unacceptable media damage. Also, it can be readily coiled or otherwise configured for use, again without unacceptable media damage. Of course, it must be of a nature such that it will maintain the required corrugated configuration, during use.

In the corrugation process, an inelastic deformation is caused to the media. This prevents the media from returning to its original shape. However, once the tension is released the flute or corrugations will tend to spring back, recovering only a portion of the stretch and bending that has occurred. The facing sheet is sometimes tacked to the fluted sheet, to inhibit this spring back in the corrugated sheet.

Also, typically, the media contains a resin. During the corrugation process, the media can be heated to above the glass transition point of the resin. When the resin then cools, it will help to maintain the fluted shapes.

The media of the corrugated sheet 3 facing sheet 4 or both, can be provided with a fine fiber material on one or both sides thereof, for example in accord with U.S. Pat. No. 6,673,136, incorporated herein by reference.

An issue with respect to z-filter constructions relates to closing of the individual flute ends. Typically a sealant or adhesive is provided, to accomplish the closure. As is apparent from the discussion above, in typical z-filter media, especially that which uses straight flutes as opposed to tapered flutes, large sealant surface areas (and volume) at both the upstream end and the downstream end are needed. High quality seals at these locations are critical to proper operation of the media structure that results. The high sealant volume and area, creates issues with respect to this.

Still referring to FIG. 1, at 20 tack beads are shown positioned between the corrugated sheet 3 and facing sheet 4, securing the two together. The tack beads can be for example, discontinuous lines of adhesive. The tack beads can also be points in which the media sheets are welded together.

From the above, it will be apparent that the corrugated sheet 3 is typically not secured continuously to the facing sheet, along the troughs or ridges where the two adjoin. Thus, air can flow between adjacent inlet flutes, and alternately between the adjacent outlet flutes, without passage through the media. However air which has entered in inlet flute cannot exit from an outlet flute, without passing through at least one sheet of media, with filtering.

Figure 2:
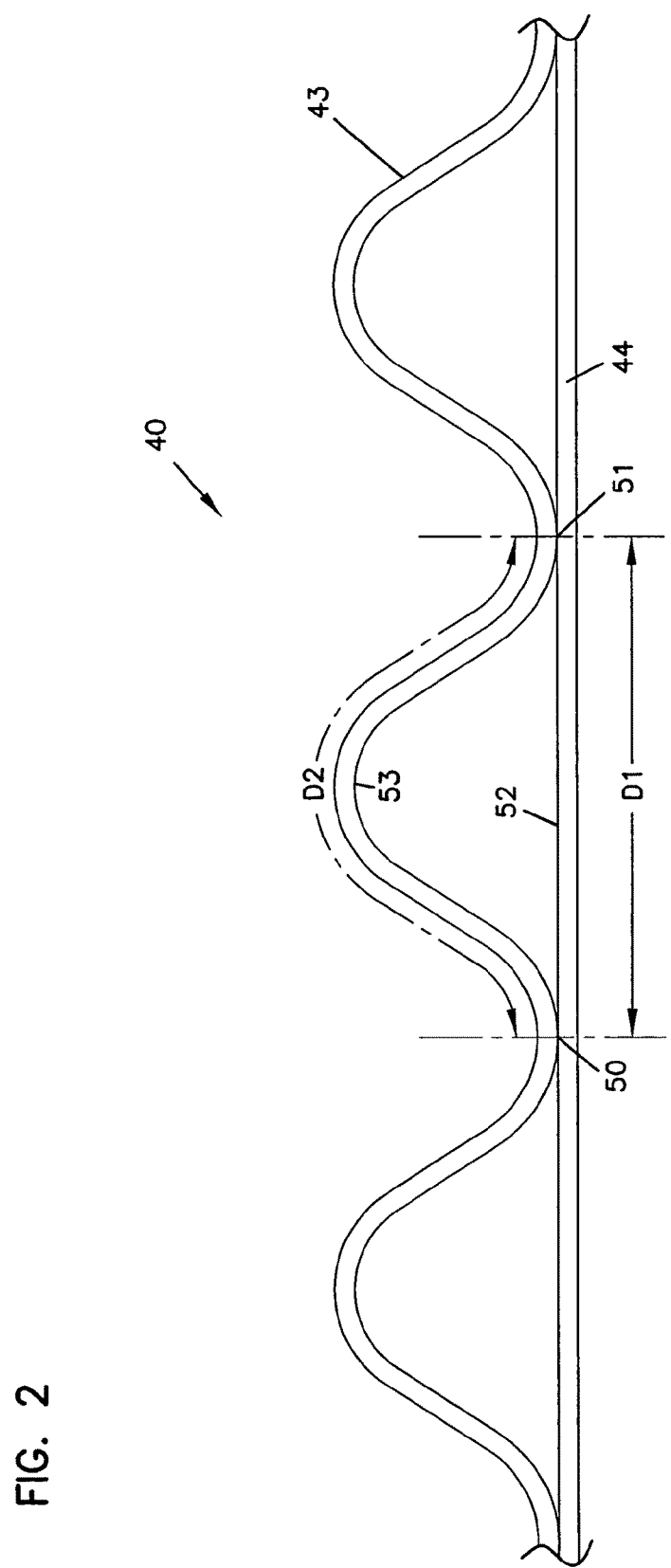
FIG. 2 is an enlarged, schematic, fragmentary view of a single facer sheet comprising fluted media secured to facing media.

Attention is now directed to FIG. 2, in which a z-filter media construction 40 utilizing a fluted (in this instance regular, curved, wave pattern corrugated) sheet 43, and a non-corrugated flat, facing, sheet 44, is depicted. The distance D1, between points 50 and 51, defines the extension of flat media 44 in region 52 underneath a given corrugated flute 53. The length D2 of the arch-shaped media for the corrugated flute 53, over the same distance D1 is of course larger than D1, due to the shape of the corrugated flute 53. For a typical regular shaped media used in fluted filter applications, the linear length D2 of the media 53 between points 50 and 51 will generally be at least 1.2 times D1. Typically, D2 would be within a range of 1.2-2.0, inclusive. One particularly convenient arrangement for air filters has a configuration in which D2 is about 1.25-1.35×D1. Such media has, for example, been used commercially in Donaldson Powercore™ Z-filter arrangements. Herein the ratio D2/D1 will sometimes be characterized as the flute/flat ratio or media draw for the corrugated media.

Figure 3:
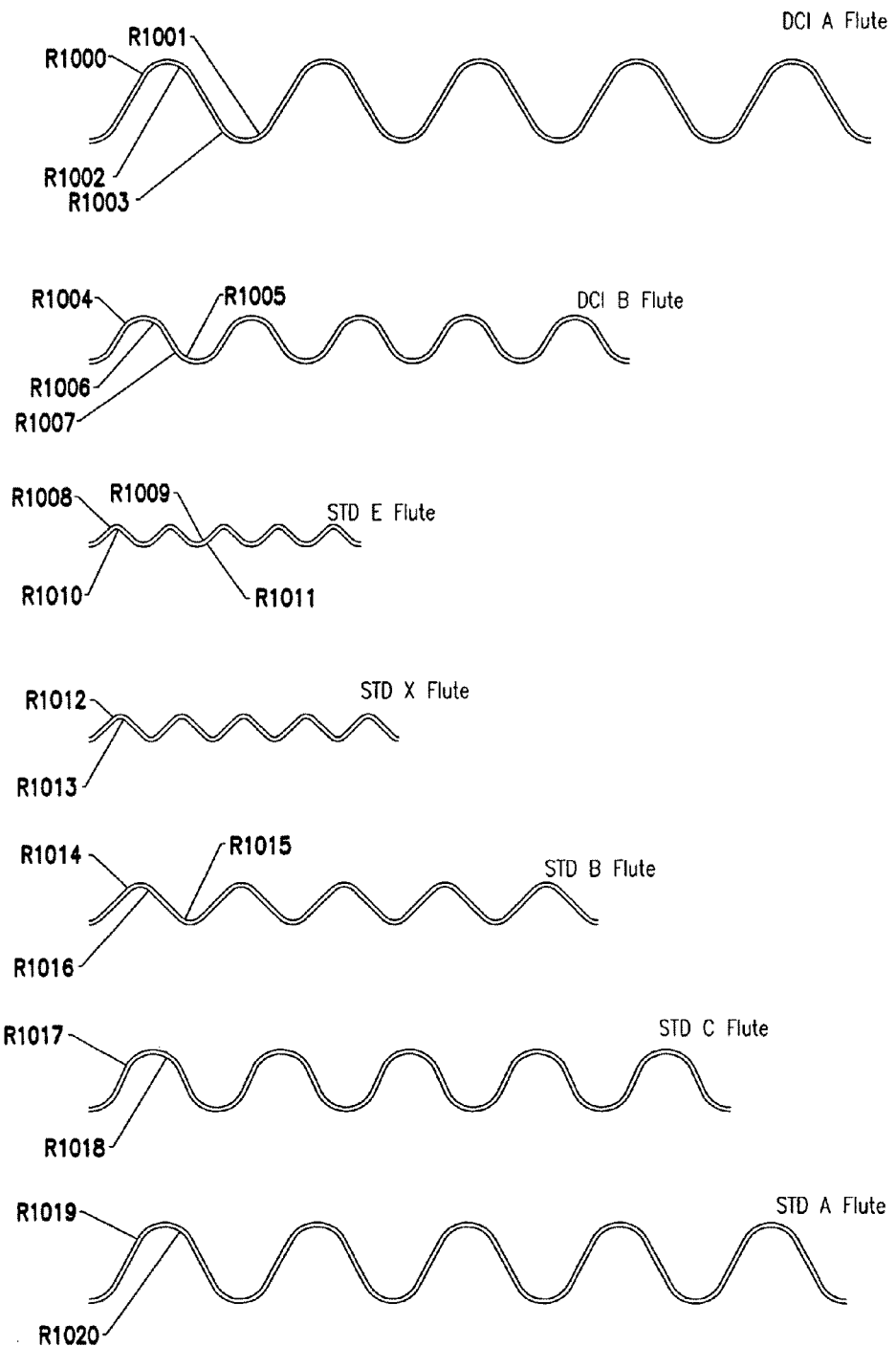
FIG. 3 is a schematic view of various selected flute shapes.

In the corrugated cardboard industry, various standard flutes have been defined. For example the standard E flute, standard X flute, standard B flute, standard C flute and standard A flute. FIG. 3, attached, in combination with Table A below provides definitions of these flutes.

Donaldson Company, Inc., (DCI) the assignee of the present disclosure, has used variations of the standard A and standard B flutes, in a variety of z-filter arrangements. These flutes are also defined in Table A and FIG. 3.

TABLE A (Flute definitions for FIG. 3)

| | |
|---|---|
| DCI A Flute: | Flute/flat = 1.52:1; The Radii (R) are as follows: R1000 = .0675 inch (1.715 mm); R1001 = .0581 inch (1.476 mm); R1002 = .0575 inch (1.461 mm); R1003 = .0681 inch (1.730 mm). |
| DCI B Flute: | Flute/flat = 1.32:1; The Radii (R) are as follows: R1004 = .0600 inch (1.524 mm); R1005 = .0520 inch (1.321 mm); R1006 = .0500 inch (1.270 mm); R1007 = .0620 inch (1.575 mm); |
| Std. E Flute: | Flute/flat = 1.24:1; The Radii (R) are as follows: R1008 = .0200 inch (.508 mm); R1009 = .0300 inch (.762 mm); R1010 = .0100 inch (.254 mm); R1011 = .0400 inch (1.016 mm); |
| Std. X Flute: | Flute/flat = 1.29:1; The Radii (R) are as follows: R1012 = .0250 inch (.635 mm); R1013 = .0150 inch (.381 mm); |
| Std. B Flute: | Flute/flat = 1.29:1; The Radii (R) are as follows: R1014 = .0410 inch (1.041 mm); R1015 = .0310 inch (.7874 mm); R1016 = .0310 inch (.7874 mm). |
| Std. C Flute: | Flute/flat = 1.46:1; The Radii (R) are as follows: R1017 = .0720 inch (1.829 mm); R1018 = .0620 inch (1.575 mm). |
| Std. A Flute: | Flute/flat = 1.53:1; The Radii (R) are as follows: R1019 = .0720 inch (1.829 mm); R1020 = .0620 inch (1.575 mm). |

Of course other, standard, flutes definitions from the corrugated box industry are known.

In general, standard flute configurations from the corrugated box industry can be used to define corrugation shapes or approximate corrugation shapes for corrugated media. Comparisons above between the DCI A flute and DCI B flute, and the corrugation industry standard A and standard B flutes, indicate some convenient variations. Other flute shapes, including ones with straight sides or side portions, are possible.

II. Manufacture of Coiled Media Configurations Using Fluted Media, Generally

Figure 4:
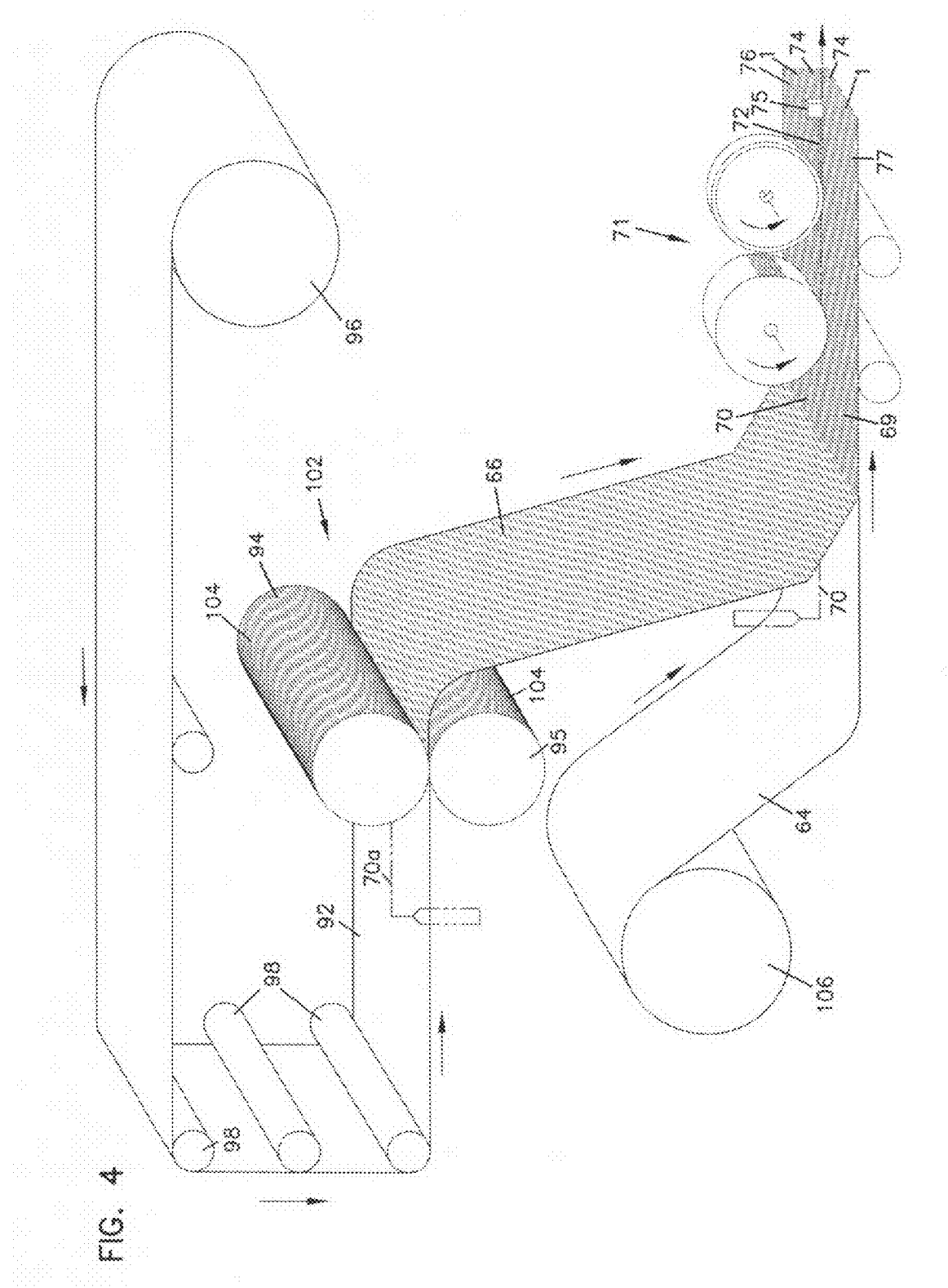
FIG. 4 is a schematic view of a process for making single facer media according to the present disclosure.

In FIG. 4, one example of a manufacturing process for making a media strip (single facer) corresponding to strip 1, FIG. 1 is shown. In general, facing sheet 64 and the fluted (corrugated) sheet 66 having flutes 68 are brought together to form a media web 69, with an adhesive bead located therebetween at 70. The adhesive bead 70 will form a single facer bead 10, FIG. 1. An optional darting process occurs at station 71 to form center darted section 72 located mid-web. The z-filter media or Z-media strip 74 can be cut or slit at 75 along the bead 70 to create two pieces 76, 77 of z-filter media 74, each of which has an edge with a strip of sealant (single facer bead) extending between the corrugating and facing sheet. Of course, if the optional darting process is used, the edge with a strip of sealant (single facer bead) would also have a set of flutes darted at this location.

Techniques for conducting a process as characterized with respect to FIG. 4 are described in PCT WO 04/007054, published Jan. 22, 2004 incorporated herein by reference.

Still in reference to FIG. 4, before the z-filter media 74 is put through the darting station 71 and eventually slit at 75, it must be formed. In the schematic shown in FIG. 4, this is done by passing a sheet of media 92 through a pair of corrugation rollers 94, 95. In the schematic shown in FIG. 4, the sheet of media 92 is unrolled from a roll 96, wound around tension rollers 98, and then passed through a nip or bite 102 between the corrugation rollers 94, 95. The corrugation rollers 94, 95 have teeth 104 that will give the general desired shape of the corrugations after the flat sheet 92 passes through the nip 102. After passing through the nip 102, the sheet 92 becomes corrugated across the machine direction and is referenced at 66 as the corrugated sheet. The corrugated sheet 66 is then secured to facing sheet 64. (The corrugation process may involve heating the media, in some instances.)

Still in reference to FIG. 4, the process also shows the facing sheet 64 being routed to the darting process station 71. The facing sheet 64 is depicted as being stored on a roll 106 and then directed to the corrugated sheet 66 to form the Z-media 74. The corrugated sheet 66 and the facing sheet 64 would typically be secured together by adhesive or by other means (for example by sonic welding).

Referring to FIG. 4, an adhesive line 70 is shown used to secure corrugated sheet 66 and facing sheet 64 together, as the sealant bead. Alternatively, the sealant bead for forming the facing bead could be applied as shown as 70a. If the sealant is applied at 70a, it may be desirable to put a gap in the corrugation roller 95, and possibly in both corrugation rollers 94, 95, to accommodate the bead 70a.

Of course the equipment of FIG. 4 can be modified to provide for the tack beads 20, if desired.

The type of corrugation provided to the corrugated media is a matter of choice, and will be dictated by the corrugation or corrugation teeth of the corrugation rollers 94, 95. One useful corrugation pattern will be a regular curved wave pattern corrugation, of straight flutes, as defined herein above. A typical regular curved wave pattern used, would be one in which the distance D2, as defined above, in a corrugated pattern is at least 1.2 times the distance D1 as defined above. In example applications, typically D2=1.25-1.35×D1, although alternatives are possible. In some instances the techniques may be applied with curved wave patterns that are not "regular," including, for example, ones that do not use straight flutes. Also, variations from the curved wave patterns shown, are possible.

Figure 5:
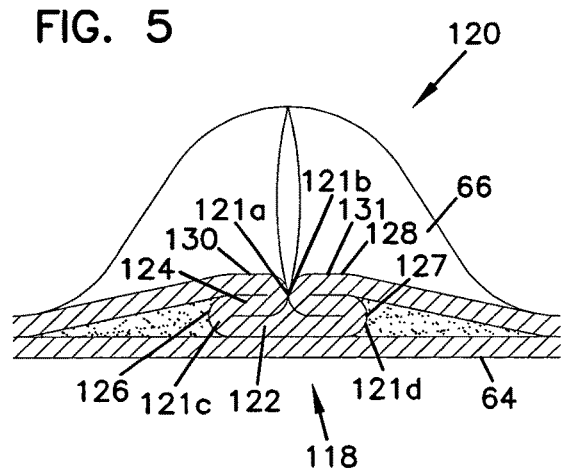
FIG. 5 is schematic, cross-sectional view of an example darted flute.

As described, the process shown in FIG. 4 can be used to create the center darted section 72. FIG. 5 shows, in cross-section, one of the flutes 68 after darting and slitting.

A fold arrangement 118 can be seen to form a darted flute 120 with four creases 121a, 121b, 121c, 121d. The fold arrangement 118 includes a flat first layer or portion 122 that is secured to the facing sheet 64. A second layer or portion 124 is shown pressed against the first layer or portion 122. The second layer or portion 124 is preferably formed from folding opposite outer ends 126, 127 of the first layer or portion 122.

Still referring to FIG. 5, two of the folds or creases 121a, 121b will generally be referred to herein as "upper, inwardly directed" folds or creases. The term "upper" in this context is meant to indicate that the creases lie on an upper portion of the entire fold 120, when the fold 120 is viewed in the orientation of FIG. 5. The term "inwardly directed" is meant to refer to the fact that the fold line or crease line of each crease 121a, 121b, is directed toward the other.

In FIG. 5, creases 121c, 121d, will generally be referred to herein as "lower, outwardly directed" creases. The term "lower" in this context refers to the fact that the creases 121c, 121d are not located on the top as are creases 121a, 121b, in the orientation of FIG. 5. The term "outwardly directed" is meant to indicate that the fold lines of the creases 121c, 121d are directed away from one another.

The terms "upper" and "lower" as used in this context are meant specifically to refer to the fold 120, when viewed from the orientation of FIG. 5. That is, they are not meant to be otherwise indicative of direction when the fold 120 is oriented in an actual product for use.

Based upon these characterizations and review of FIG. 5, it can be seen that a regular fold arrangement 118 according to FIG. 5 in this disclosure is one which includes at least two "upper, inwardly directed, creases." These inwardly directed creases are unique and help provide an overall arrangement in which the folding does not cause a significant encroachment on adjacent flutes.

A third layer or portion 128 can also be seen pressed against the second layer or portion 124. The third layer or portion 128 is formed by folding from opposite inner ends 130, 131 of the third layer 128.

Another way of viewing the fold arrangement 118 is in reference to the geometry of alternating ridges and troughs of the corrugated sheet 66. The first layer or portion 122 is formed from an inverted ridge. The second layer or portion 124 corresponds to a double peak (after inverting the ridge) that is folded toward, and in preferred arrangements, folded against the inverted ridge.

Techniques for providing the optional dart described in connection with FIG. 5, in a preferred manner, are described in PCT WO 04/007054, incorporated herein by reference. Techniques for coiling the media, with application of the winding bead, are described in PCT application US 04/07927, filed Mar. 17, 2004 and incorporated herein by reference.

Alternate approaches to darting the fluted ends closed are possible. Such approaches can involve, for example, darting which is not centered in each flute, and rolling or folding over the various flutes. In general, darting involves folding or otherwise manipulating media adjacent to fluted end, to accomplish a compressed, closed, state.

Techniques described herein are particularly well adapted for use in media packs that result from a step of coiling a single sheet comprising a corrugated sheet/facing sheet combination, i.e., a "single facer" strip.

Coiled media pack arrangements can be provided with a variety of peripheral perimeter definitions. In this context the term "peripheral, perimeter definition" and variants thereof, is meant to refer to the outside perimeter shape defined, looking at either the inlet end or the outlet end of the media pack. Typical shapes are circular as described in PCT WO 04/007054 and PCT application US 04/07927. Other useable shapes are obround, some examples of obround being oval shape. In general oval shapes have opposite curved ends attached by a pair of opposite sides. In some oval shapes, the opposite sides are also curved. In other oval shapes, sometimes called racetrack shapes, the opposite sides are generally straight. Racetrack shapes are described for example in PCT WO 04/007054 and PCT application US 04/07927, each of which is incorporated herein by reference.

Another way of describing the peripheral or perimeter shape is by defining the perimeter resulting from taking a cross-section through the media pack in a direction orthogonal to the winding access of the coil.

Opposite flow ends or flow faces of the media pack can be provided with a variety of different definitions. In many arrangements, the ends are generally flat and perpendicular to one another. In other arrangements, the end faces include tapered, coiled, stepped portions which can either be defined to project axially outwardly from an axial end of the side wall of the media pack; or, to project axially inwardly from an end of the side wall of the media pack.

The flute seals (for example from the single facer bead, winding bead or stacking bead) can be formed from a variety of materials. In various ones of the cited and incorporated references, hot melt or polyurethane seals are described as possible for various applications.

III. Coiled and Arch-Shaped Media Pack Configurations, FIGS. 6-8A

Figure 6:
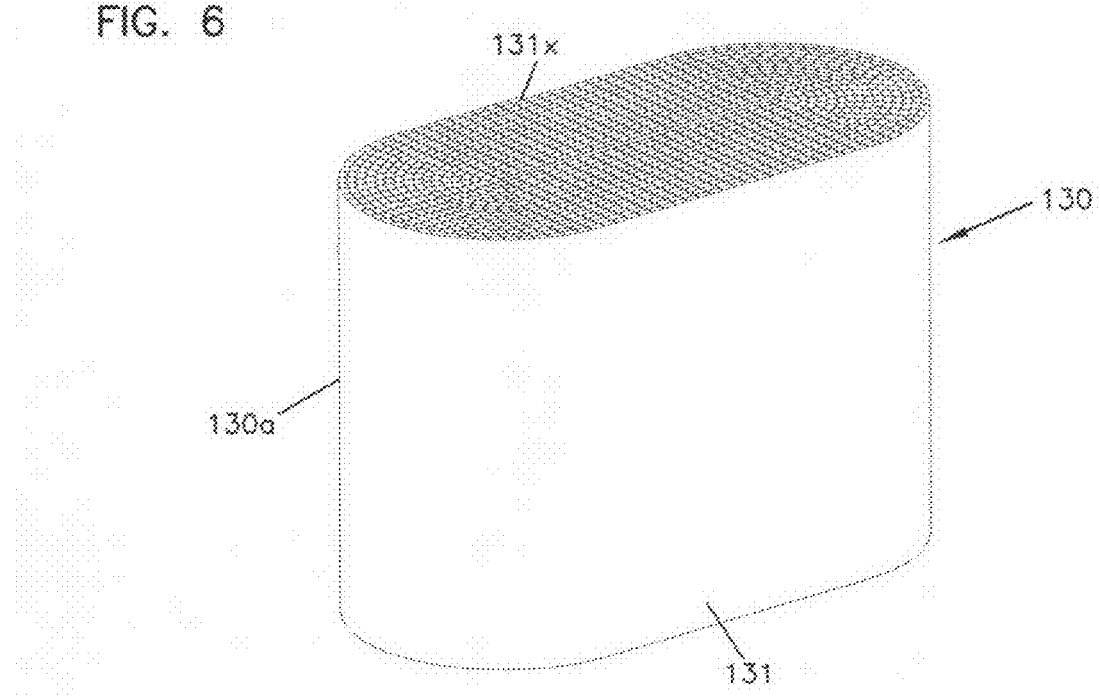
FIG. 6 is schematic, perspective view of a coiled media construction comprising a coiled sheet of single facer material.

Reference numeral 130, FIG. 6, generally indicates a coiled media pack according the present disclosure. The coiled media pack 130 comprises a single strip 130a of single facer material comprising a fluted sheet secured to facing sheet coiled around a center. Typically, the coiling is with facing sheeting directed outwardly. As previously described, in general a single facer bead and winding bead would be used, to provide flute seals within the media.

The particular coiled media pack 130 depicted comprises an oval media pack 131. It is noted that the principles described herein, however, can be applied starting with the media pack having a circular configuration.

Figure 7:
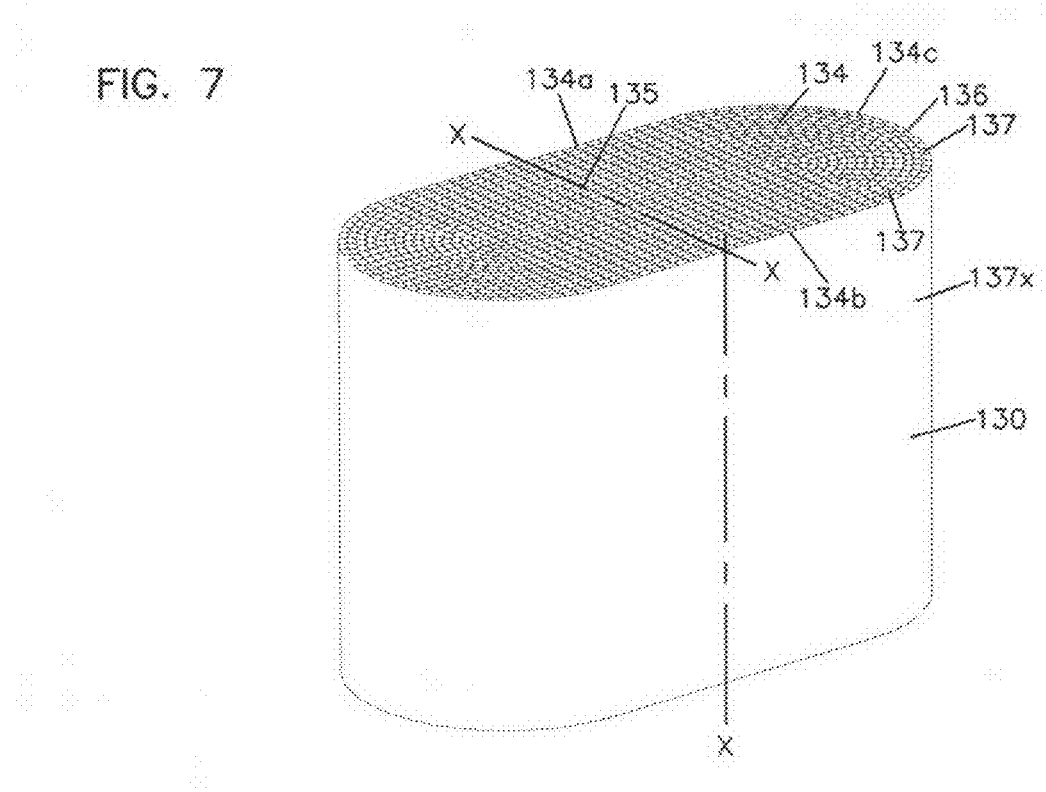
FIG. 7 is schematic, perspective view of a step of forming a media pack by cutting the oval shaped arrangement of FIG. 6, along plane x-x.

For purposes of the present disclosure, a generally "D" shaped media pack is preferred. This can be formed by cutting the coiled media pack 130 along a center plane or other selected plane, an example indicated at cut plane X-X, FIG. 7. In FIG. 7, D-shaped media pack which will result from such a cut, is shown at 134. The media pack 134 will include a cut side 135 and an opposite arch-shaped side 136. Alternately stated, the typical preferred media pack shape application according to the principles described herein, is one in which the media pack has a perimeter shape corresponding to a flat side and opposite arch-shaped side. For media pack 134, the flat side 135 in the arch-shaped side is side 136. A variety of shapes of arches can be used, but typically the arch will have a center section which has a radius corresponding to a circular curve.

Still referring to FIG. 7, it will be understood that media pack 134 which will result from cutting pack 130 along plane X-X, will generally comprise a plurality of arched strips 137 of single facer media material (fluted sheet secured to facing sheet), with an outer most strip 137x and a series of strips nested within outer 137x, each with the arcuate or arched portion coming tighter and narrower.

It is also noted that since the media pack 130 had a generally oval shape, and plane X-X was an approximate center, the resulting media pack will have a D-shape, with opposite straight sections 134a, 134b adjacent cut face 135, and a central arch-shaped section 134c opposite face 135. The arch-shaped section 134c, however in the example shown, will have an arc of curvature generally corresponding to a circular radius.

It is noted that, in an alternative, for example, if the media pack 130 has a circular shape, the resulting media pack from a central cut will not have the opposite straight sections 134a, 134b, but rather will comprise arch-shaped strips of single facer media, with an outer perimeter having no straight sections in the arch-shaped region.

It is noted that the media pack 130 and/or the cut media pack 134 can be provided with an outer protective wrap or covering, if desired.

Figure 8:
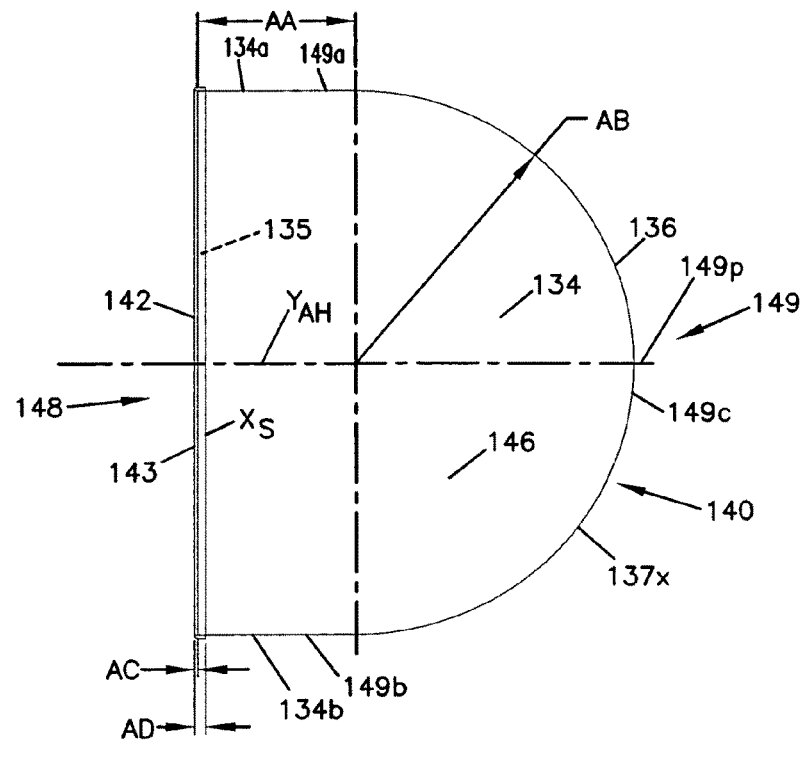
FIG. 8 is schematic, plan view of a media pack from the operation of FIG. 7 with a side thereof having a side panel thereon.

The cut side 135 of media pack 134 should be sealed against unrestricted passage of air therethrough. In FIG. 8, the media pack cut side 135 is shown closed at least in part (and typically entirely) by a side panel 142, to form media pack 140. Although alternatives are possible, the panel 142 can comprise of molded-in-place panel 143 in which the cut side 135 is embedded. Typically, panel 142 would comprise a molded-in-place polyurethane foam or similar material. Polyurethane materials as described herein below, can be used.

Figure 8A:
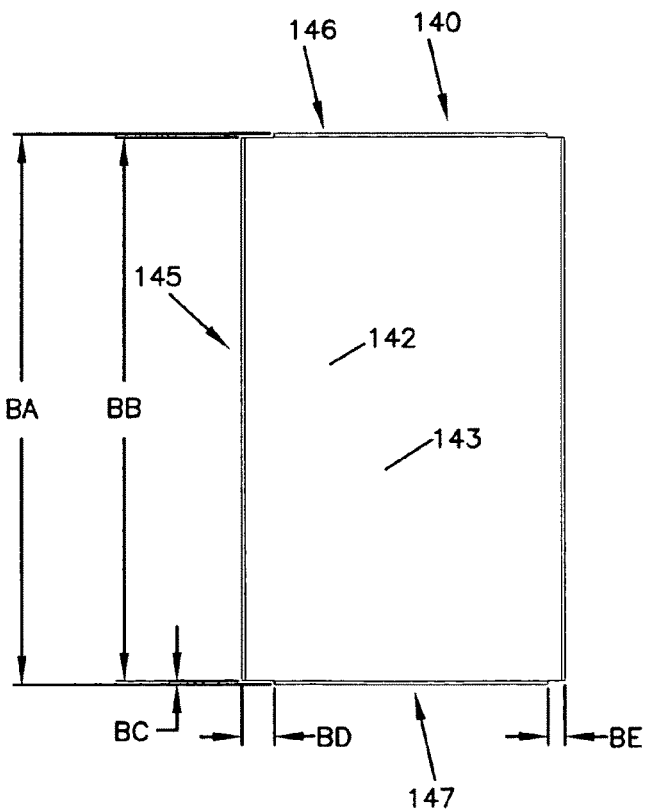
FIG. 8A is a schematic, side plan view of the media pack of FIG. 8.

In general, media pack 140, FIG. 8A (a side view), comprises a first flow face 146 and second opposite flow face 147. During filtering, air flows into one of the flow faces. Flutes generally extend between the flow faces 146 and 147. Filtering occurs as the air encounters a blockage forcing passage through the media in order to exit from an opposite flow face.

Referring to FIG. 8, media pack 140 can generally viewed as comprising an arch-shaped media pack of single facer strips, comprising a outer most strip with a plurality of inner strips nested within the outer most strip and within one another. The outer most strip is, again, indicated generally at 137x.

Still referring to FIG. 8, the general perimeter shape of the media pack 140 is viewable comprising a straight or flat side 148 and an opposite arch-shaped side 149. The arch-shaped side 149 may be a circular arc, or maybe an arc having opposite straight sections 149a 149b with arch-shaped section 149c therebetween. (In FIG. 8, sections 149a, 149b correspond to media pack straight sections 134a, 134b respectively; and, arch-shaped section 149c corresponds to media pack arch-shaped section 136). In general terms, the arch-shaped side 149c will have a D-shape. It may by semi-circular, in which case it would not have straight sections corresponding 149a, 149b, or it may comprise a media pack resulting from a cut through an oval shaped media pack with opposite generally parallel sides, resulting in side sections 149a, and 149b. Other specific variations in shape, however, while maintaining a general "D" shape, are possible.

In FIGS. 8 and 9 example dimensions of a media pack for use in a over the highway truck are provided, as follows: in FIG. 8, AA=the length of straight sections 149a, 149b and is typically at least 50 mm, in the example shown 100 mm; dimension AB is a radius of arch-shaped section 149c, typically having a radius of at least 80 mm, usually at least 120 mm, and for the example shown 175 mm radius; AC=2 mm; and, AD=7 mm; in FIG. 8a for the example shown BA=355 mm; BB=350.5 mm; BC=2.2 mm; BD=20 mm; and, BE=11 mm.

Typically, the length of the straight side, 148, of the D-shaped media pack, will be referred to herein as dimension $X_s$. The height of the arc, i.e. the distance between straight side 148 and peak 149p, will be referred to as the arch $Y_{AH}$. While alternatives are possible, in typical arrangements according to the present disclosure, a ratio of the straight side length $x_s$ to the arch height $Y_{AH}$ will be within the range of 1.0-2.0. Many examples having straight side sections the arch region 149, as shown in FIG. 8, the ratio will be within the range of 1.1-1.4.

Referring again to FIGS. 6 and 7, is the cut plane X-X leaves a short excess strip of material adjacent to single facer end 131x, FIG. 6, the short strip can be removed before media pack is incorporated into a filter cartridge, if desired.

IV. An Air Filter Cartridge and Air Cleaner Assembly Using a D-Shaped Media Pack; FIGS. 9-31

A. A Filter Cartridge, FIGS. 9-19

A media pack in the form of media pack 140, comprising a plurality of nested arch-shaped strips of single facer material, each comprising a fluted sheet secured to a facing sheet, can be incorporated into a D-shape filter cartridge. In FIG. 9, such a filter cartridge is indicated generally at 200. Cartridge 200 includes media pack 140 and housing seal arrangement. The perimeter cartridge 200 depicted includes opposite D-shaped brackets or end pieces 210, 211. The example D-shaped pieces 210, 211 depicted are each a ring secured to the media pack 142, for example with an adhesive, although alternative methods of attachments are possible. In the example shown, each of the rings 210, 211 is a perimeter ring. By this it is meant at least a portion of each ring 210, 211 has a D-shape and extends around a perimeter of media pack 140.

Media pack 140 can be viewed as having first and second opposite flow surfaces 212a, 212b. For purposes of the example, assume: that end face flow face 212a is an outlet flow face, 212o; and, that end face 212b is an inlet flow face 212i.

Referring to FIG. 9, piece 210, then, is depicted as a perimeter ring having a portion positioned surrounding media pack 140, adjacent to second inlet, flow face 212i. Ring 210 is generally a bracket ring, and used for securing media pack 140 within an air cleaner assembly as described below. In the example shown, the bracket ring 210 includes thereon a handle arrangement, in the example shown, in the form of a pair of lift rings or handles 213, although alternatives are possible.

The particular handle rings 213 are positioned adjacent opposite ends of a straight side 200s of the cartridge 200, but oriented on the arch-side 200c. The rings 213 each include a central aperture, to facilitate grasping and lifting the cartridge 200.

Opposite the straight side 200s, the cartridge 200 includes an arch-shaped side 200c. In extension over the arch-shaped side 200c, and in the example depicted, generally centered thereon, ring 210 includes a projection arrangement 214, for engagement with housing features as discussed below.

In general terms, then, bracket ring 210 is a D-shaped ring, having a straight side 210s and opposite arch-shaped projection 210c. Bracket ring 210 is secured to an end of the media pack 140 adjacent inlet flow face 212i. Bracket ring 210 surrounds media pack 140 and provides a platform for supporting: a handle arrangement such as lift rings 213; and, projection arrangement 214. As will be seen from descriptions below, straight section 210s also provides a platform for engagement by a bracket arrangement described below.

In still more general terms, the cartridge 200 includes a media pack 140 having a first and second opposite flow faces 212a, 212b. The cartridge further includes a bracket arrangement 210, in the example shown in the form of a ring surrounding a perimeter of the media pack adjacent flow face 212b. The bracket arrangement, in the example shown, is generally D-shaped, with a straight side 210s and opposite arch-shaped side 210c and includes a projection arrangement thereon for engagement with a portion of the housing. The bracket arrangement 210 further includes a handle arrangement thereon, in the example shown in the form of spaced handle members 213, each positioned on the arch-shaped section 210c at a location adjacent to straight section 210s.

Typically, bracket member 210 will be molded plastic member preformed and then secured to the media pack 140, for example, with adhesive.

Still referring to FIG. 9, cartridge 200 includes a housing seal arrangement, in the example shown including a support 211, positioned adjacent outflow face 212o. Support 211 also includes a section surrounding media pack 140, and has generally D-shaped with a straight side section 211s and opposite arch-shaped section 211c. In general, support 211 supports a housing seal arrangement 215, providing for seal between cartridge 200 and a housing into which it is installed, as described below.

In more general terms, cartridge 200 includes a housing seal arrangement having seal support member 211x, in the example shown, depicted in the form of support ring 211. In general terms, the seal support member 211x supports a housing seal member 215 for engagement with the housing, and forming a seal therewith. For the example shown, the seal support 211x includes portion surrounding media pack 140, although alternatives are possible. In a typical example, housing seal support 211x will be preformed part, made for example by molding, having the seal member 215 attached thereto, for example, by being molded-in-place. The preform having a seal member molded-in-place can then be attached to media pack 140, for example, with an adhesive. Alternative arrangements, for example formed by over molding the seal member 215 to secure the seal support 211x to the media pack, are possible.

Attention is now directed to FIG. 10, a side elevational view directed toward arch-shaped side 200c. Seal member 215 is viewable, on support ring 211. The bracket ring 210 is depicted adjacent to inlet flow face 212i.

Figure 11:
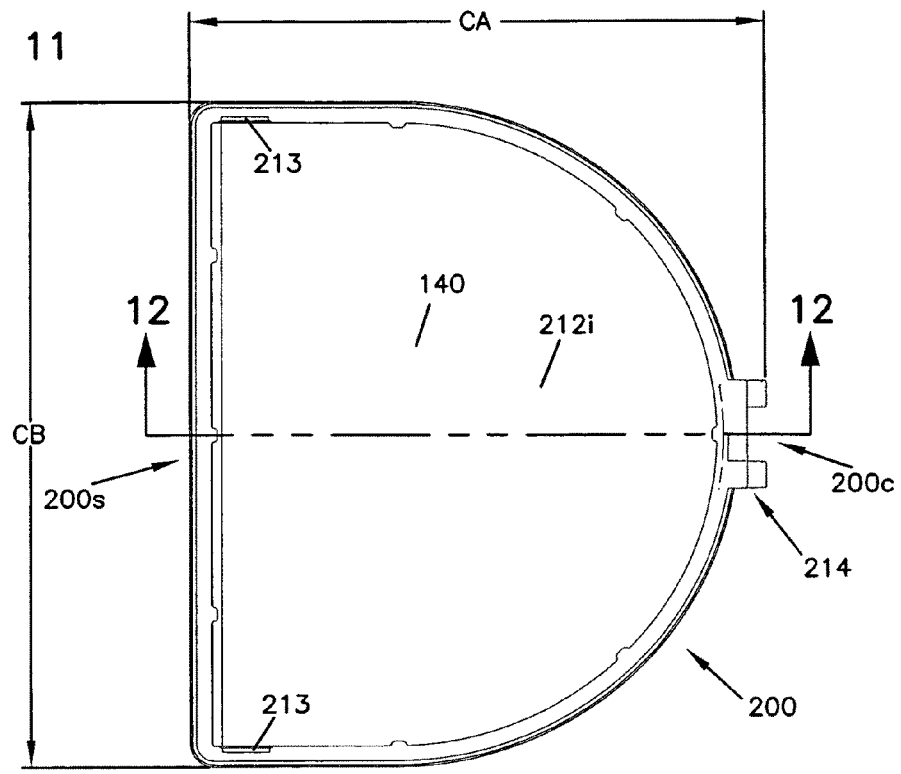
FIG. 11 is a schematic end view the filter cartridge of FIGS. 9 and 10.

In FIG. 11, a view directed toward inlet flow face to 212i of cartridge 200 is depicted.

Figure 12:
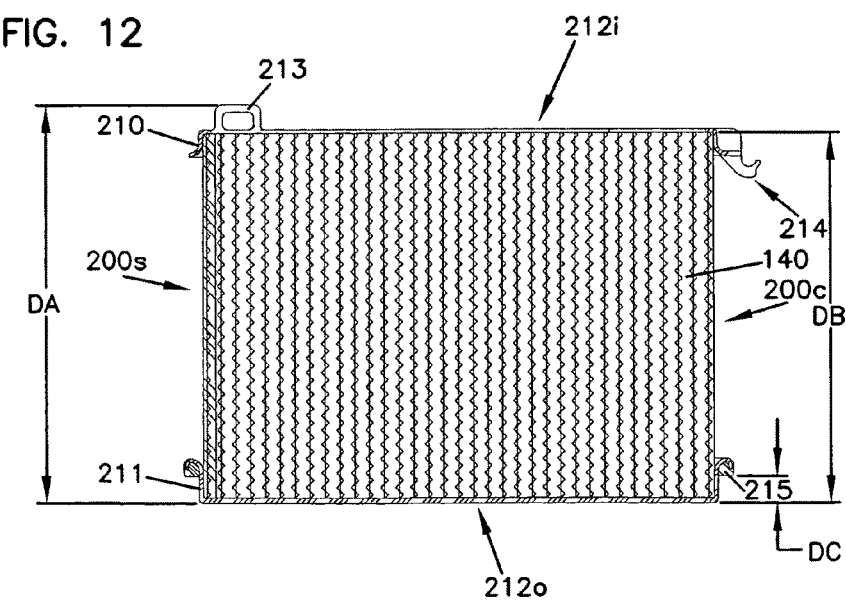
FIG. 12 is schematic, cross-sectional view taken along line 12-12, FIG. 11.

FIG. 12 is schematic, cross-sectional view taken along line 12-12, FIG. 11. Seal member 215, mounted on support piece 211, is viewable in cross-section.

Figure 13:
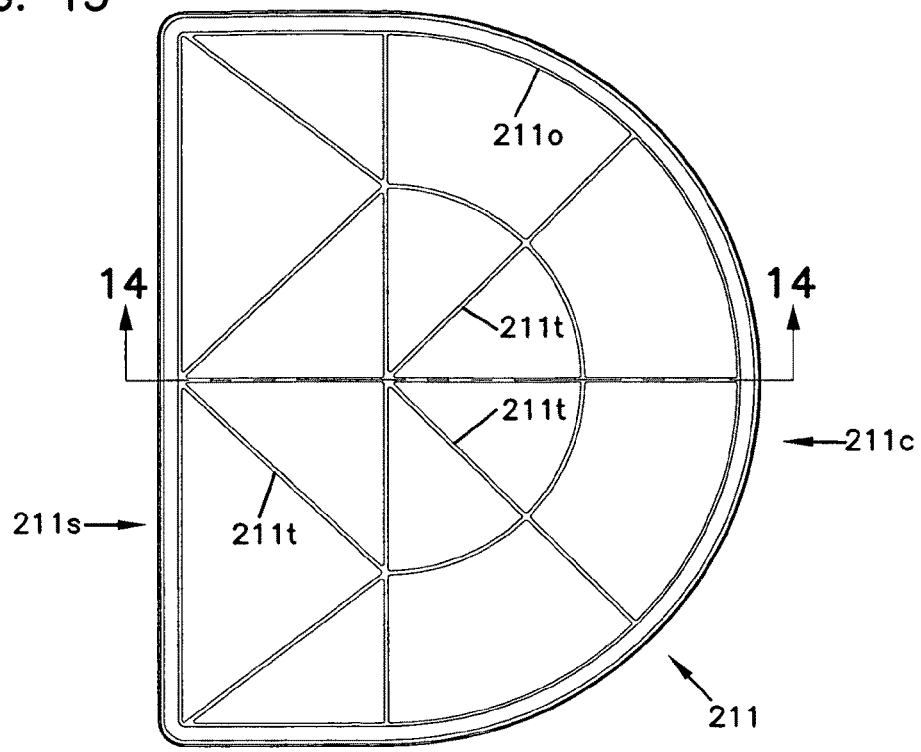
FIG. 13 is a schematic plan view of a support mountable over a first end of a media pack, in a cartridge according to FIG. 9.
Figure 14:
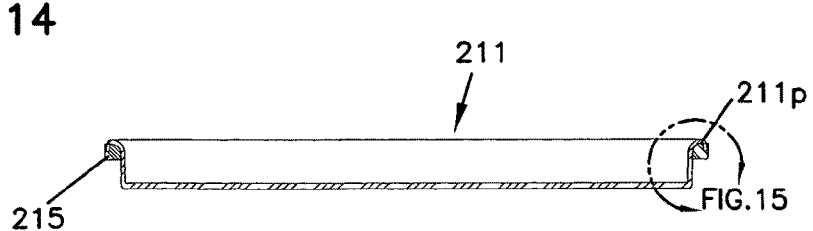
FIG. 14 is a schematic, cross-sectional view of the support of FIG. 13, taken along line 14-14 thereof.
Figure 15:
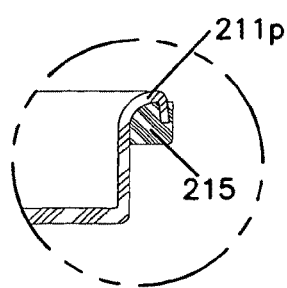
FIG. 15 is an enlarged, fragmentary, schematic, cross-sectional view of a portion of FIG. 14.

In FIGS. 13-15, support 211 is viewable. In FIG. 13, support 211 can be seen as having a D-shaped perimeter, with a straight section 21 is and an opposite arch-shaped section 211c. Support 211 can be viewed as having, extending across an open center 211o thereof, framework arrangement 211t, comprising extensions across the opening 211o. The framework 211t provides for securing of outlet flow face 212o, against telescoping in the direction of air flow; and, for structural support.

In FIG. 14, a cross-sectional view taken along 14-14, FIG. 13 is viewable, it can be seen that the perimeter of bracket 211 includes an outwardly projecting section 211p (generally projecting away from the media pack 140, FIG. 9) oriented to support housing seal 215.

In FIG. 15, and enlarged fragmentary portion of outer projection 211p is viewable. Here seal member 215 can be seen secured in place.

Seal member 215 can comprise of a variety of seal materials, secured to the projection 211p. Typically, seal member 215 will be molded-in-place, although it can be preformed and be attached to support 211. Usable seal materials include molded-in-place polyurethane foam material, as described herein below.

Seal material 215 again can be secured in a variety of matters. If molded-in-place, it may be advantageous to provide apertures through region 211p, allowing flow therethrough of resin prior to complete cure.

Figure 16:
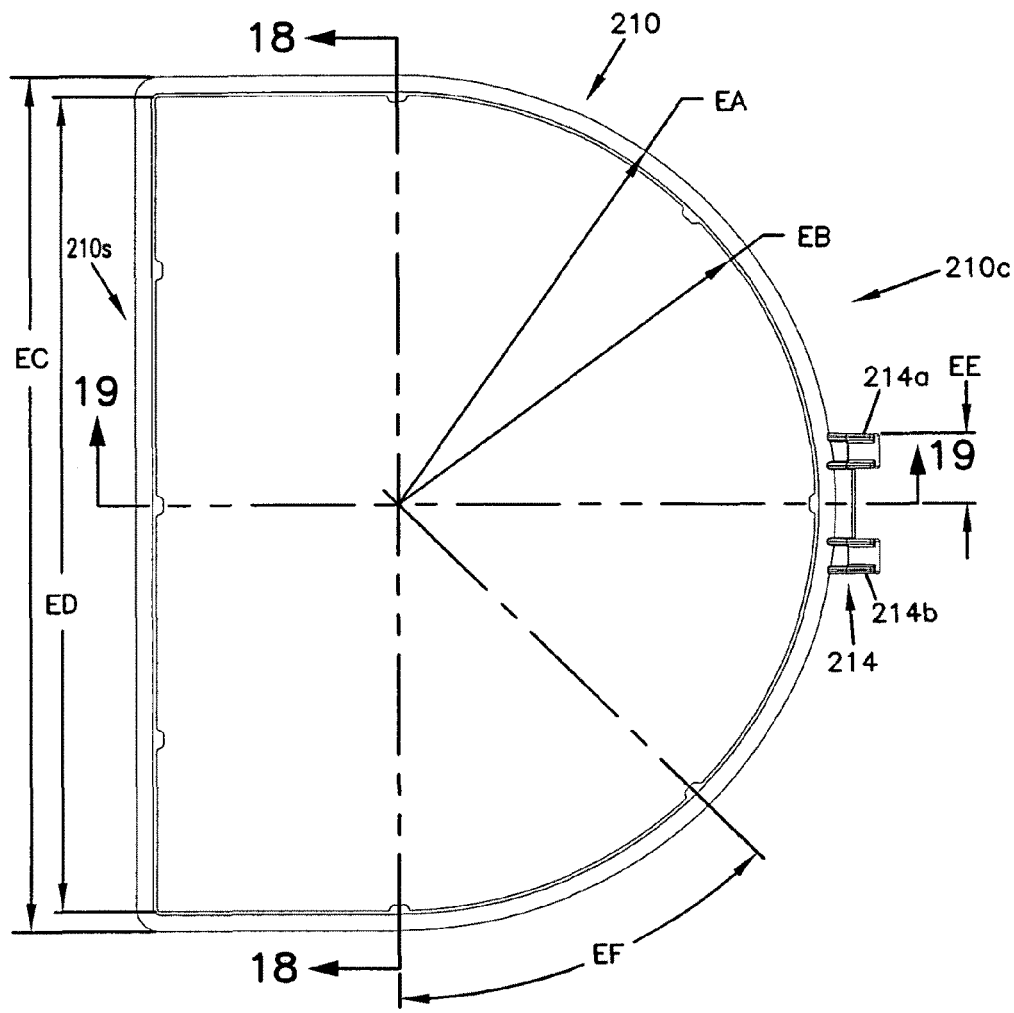
FIG. 16 is schematic plan view of a bracket member securable media pack of the cartridge of FIG. 9.
Figure 19:
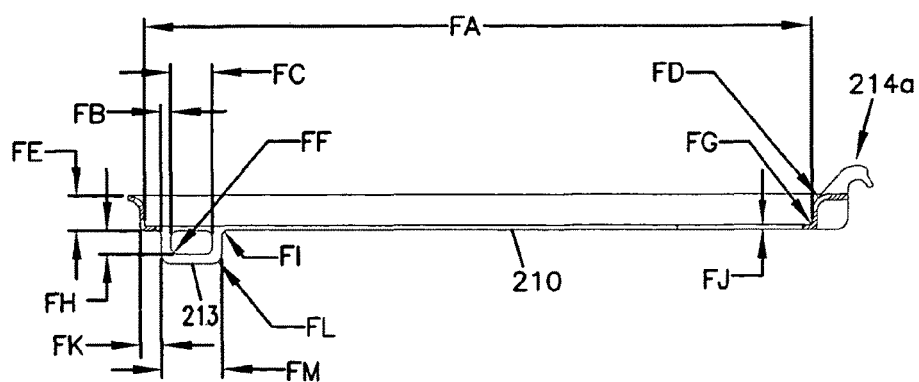
FIG. 19 is schematic, cross-sectional view taken along line 19-19, FIG. 16.

In FIG. 16-19, support or bracket 210 is viewable. Referring to FIG. 16, bracket 210 has a generally D-shape with straight side 210s and an opposite arch-shaped side 210c. Centered on the arch-shaped side 210c is projection arrangement 214 comprising, in this example, spaced projections 214a, 214b, projecting in a general direction (from arch-shaped section 210c) away from straight side 210s. In FIG. 19, a cross-sectional view taken along line 19-19, FIG. 16 is provided. Here, projection 214a can be seen as having a hook (or hinge hook) shape. Handle member 213 is also viewable in FIG. 19.

FIG. 17 is a side, elevational view directed toward arch-shaped section 210c. FIG. 18 is a cross-sectional view, taken along line 18-18, FIG. 16.

The filter cartridge of FIG. 9 is particularly configured to be positioned in an air cleaner assembly of cowl-mounted air cleaner, for an over the highway truck. By cowl-mounted, in this context, is meant that the air cleaner assembly is generally secured on the outside of the truck, in a covering over the engine, typically near the cab area. For use in such a configuration, dimensions for a useable filter cartridge are provided in FIGS. 9-19 as follows: in FIG. 11, CA=a distance across the "D" for the cartridge of at least typically 200 mm usually at least 250 mm often 250-400 mm, in the example shown 312.1 mm (including hook projection length); CB=a length of the straight side of typically at least 250 mm usually at least 300 mm often 300-450 mm, and for the example shown 370.3 mm; in FIG. 12, for the example shown, DA=222.2 mm; DB=206.2 mm; and, DC=15 mm; in FIG. 16, EA=182 mm radius; EB=173.5 mm radius; EC=364 mm; ED=347 mm; EE=29.9 mm; and, EF=45°; and, in FIG. 19, FA=277 mm; FB=4 mm; FC=17 mm; FE=15 mm; FF=3 mm radius; FG=0.5 mm radius; FD=7 mm radius; FH=10 mm; FI=2 mm radius; FJ=2 mm; FK=9 mm; FL=4 mm radius; and, FM=25 mm.

B. An Example Cowl-Mounted Air Cleaner, FIGS. 20-31

Figure 20:
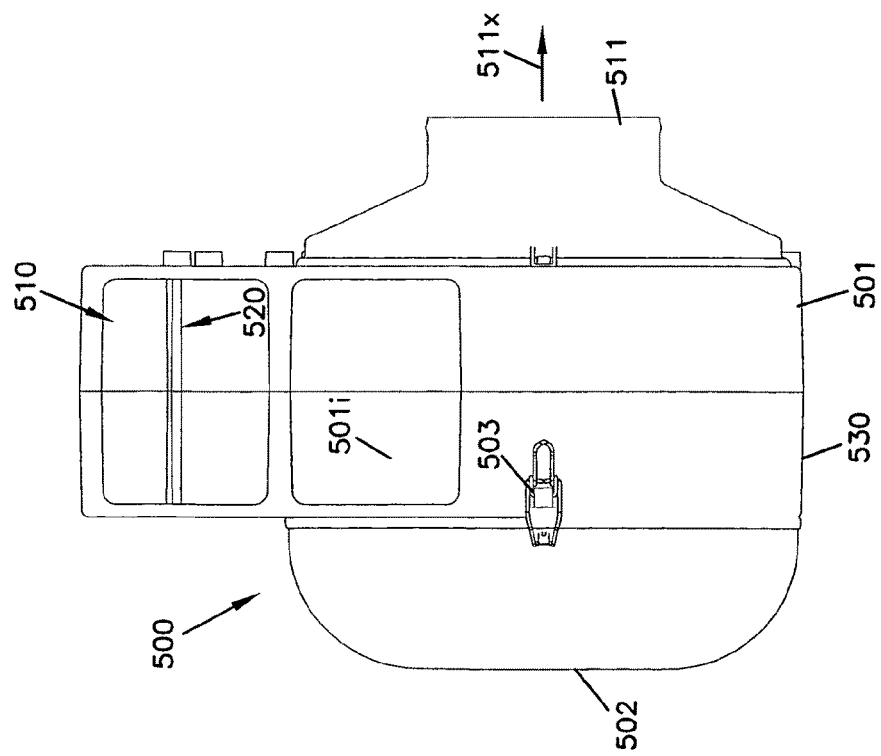
FIG. 20 is schematic front elevational view of an air cleaner assembly according to the present disclosure including a filter cartridge therein according to FIG. 9.

Reference numeral 500, FIG. 20 generally indicates air cleaner assembly according to the present disclosure. Air cleaner assembly 500 comprises housing 501 with access cover 502 mounted thereon. The access cover 502 is secured in place by latch arrangement 503. Access cover 502 is, typically, either removably mounted on the housing 501 or mounted to be pivoted relative to housing 501 to allow service access to interior 501i of the housing 501. In either event, the access cover 502 is a service cover, allowing service access to an interiorly received cartridge, for example, corresponding to cartridge 200.

Housing 501 defines an air flow inlet arrangement 510 and air flow outlet arrangement 511. Air cleaner assembly 500 will typically be mounted on the side of a truck (cowl-mounted) with the outlet 511 projecting through the cowl or engine covering. Filtered air exits from outlet 511 and is directed into an engine air intake (in typical instances including a turbo boost).

Typically, the air cleaner assembly 500 is mounted with the inlet arrangement 510, into which air to be filter flows, directed forwardly of the truck, i.e. directed in the general direction of movement of the truck, when the truck is directed forward. Alternatives are possible.

Referring to FIG. 20, it is noted that the air flow inlet arrangement in FIG. 20, is configured for inlet air flow in a direction away from the viewer, and is generally orthogonal to an air flow direction through the outlet 511, which is indicated generally by arrow 511x, FIG. 20. This will be typical for many cowl-mounted air cleaner assemblies utilizing the principles of the present disclosure. It is also noted, as will be understood from descriptions, that the filter cartridge 200 is generally orientated within assembly 500 with a flute direction, i.e. a direction between inlet face 212i and the outlet face 212o, being generally toward outlet 511.

In general, then, a filter cartridge 200 in accord with FIG. 9, is removably mounted within the air cleaner housing 501. Service access to the cartridge 200, again, is by is opening of the access cover 502.

Figure 21:
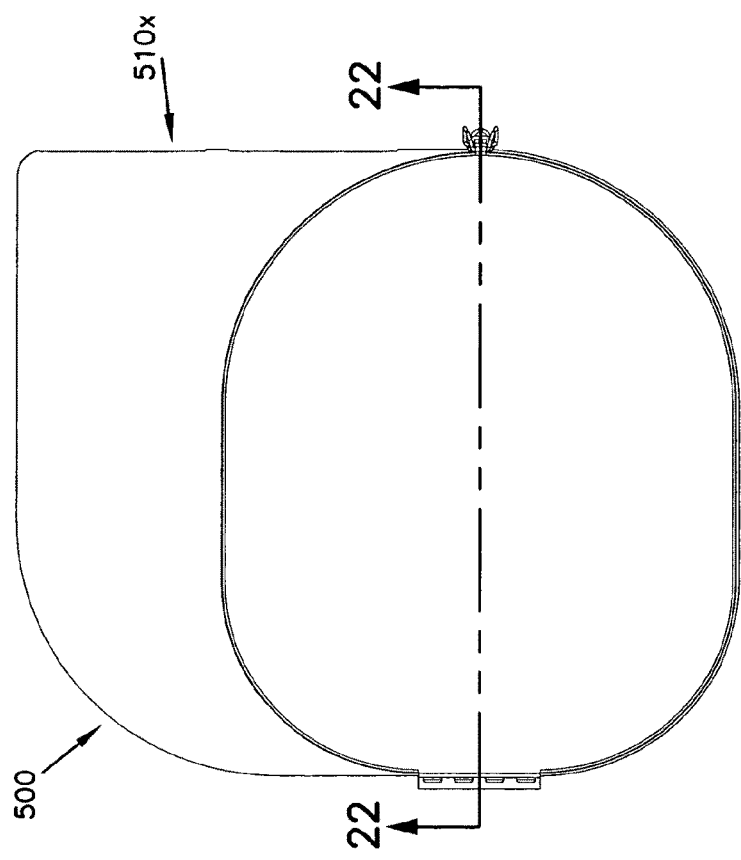
FIG. 21 is a schematic, side elevational view of the air cleaner assembly of FIG. 20.

Attention is directed to FIG. 21, a side plan view of the assembly 500. Here, the inlet flow direction is generally indicated in 510x.

Figure 22:
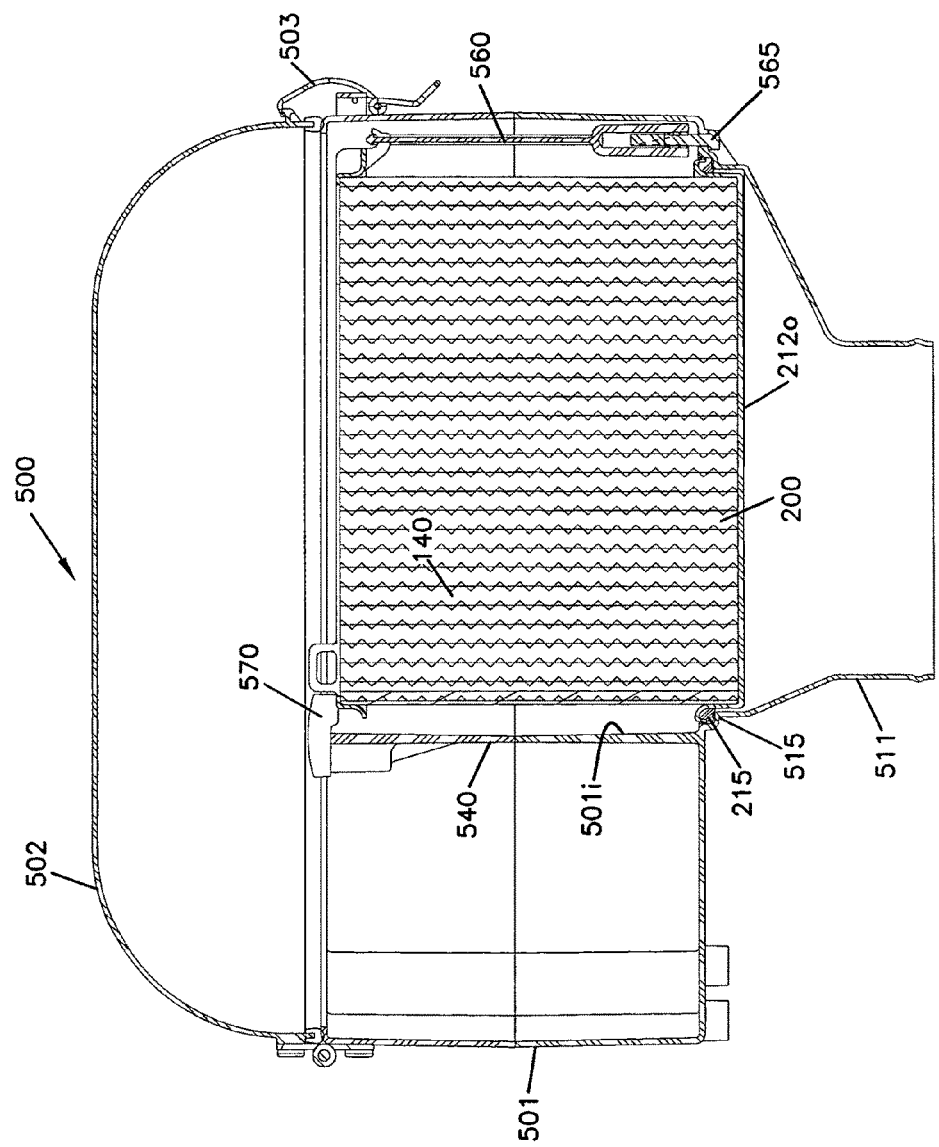
FIG. 22 is a schematic, cross-sectional view taken along line 22-22, FIG. 21.

FIG. 22 is a cross-sectional view taken generally along line 22-22, FIG. 21. In FIG. 22, selected internal features of the air cleaner 500 are viewable. In particular, housing 501 defines an interior 501i in which cartridge 200 is removably positioned. In can be seen that the cartridge 200 is positioned with outlet flow face 212o directed toward outlet 511. Housing seal member 215 is shown secured against a housing seal portion 515, within the housing 501 and surrounding outlet 511. A variety of specific sealing engagements can be utilized, including radially directed housing seals, axially directed housing seals, and seals that are a combination of both. Generally it is required that the seal engagement between seal member 215 and housing seal portion 515 be sufficient to form a housing seal inhibiting bypass flow of unfiltered air from interior 501i to outlet 511. By "bypass flow" in this context, reference is meant to an air flow which bypasses filtering flow through the media pack 140 of the filter cartridge 200.

It is noted that the air cleaner assembly 500. FIG. 20, includes a water skimmer assembly 520 within inlet 510. Description relating to the operation of the water skimmer assembly 520 is provided, in connection with later described figures. In general, water skimmer assembly 520 operates to remove water contained within inlet flow air, before it reaches filter cartridge 200.

Figure 23:
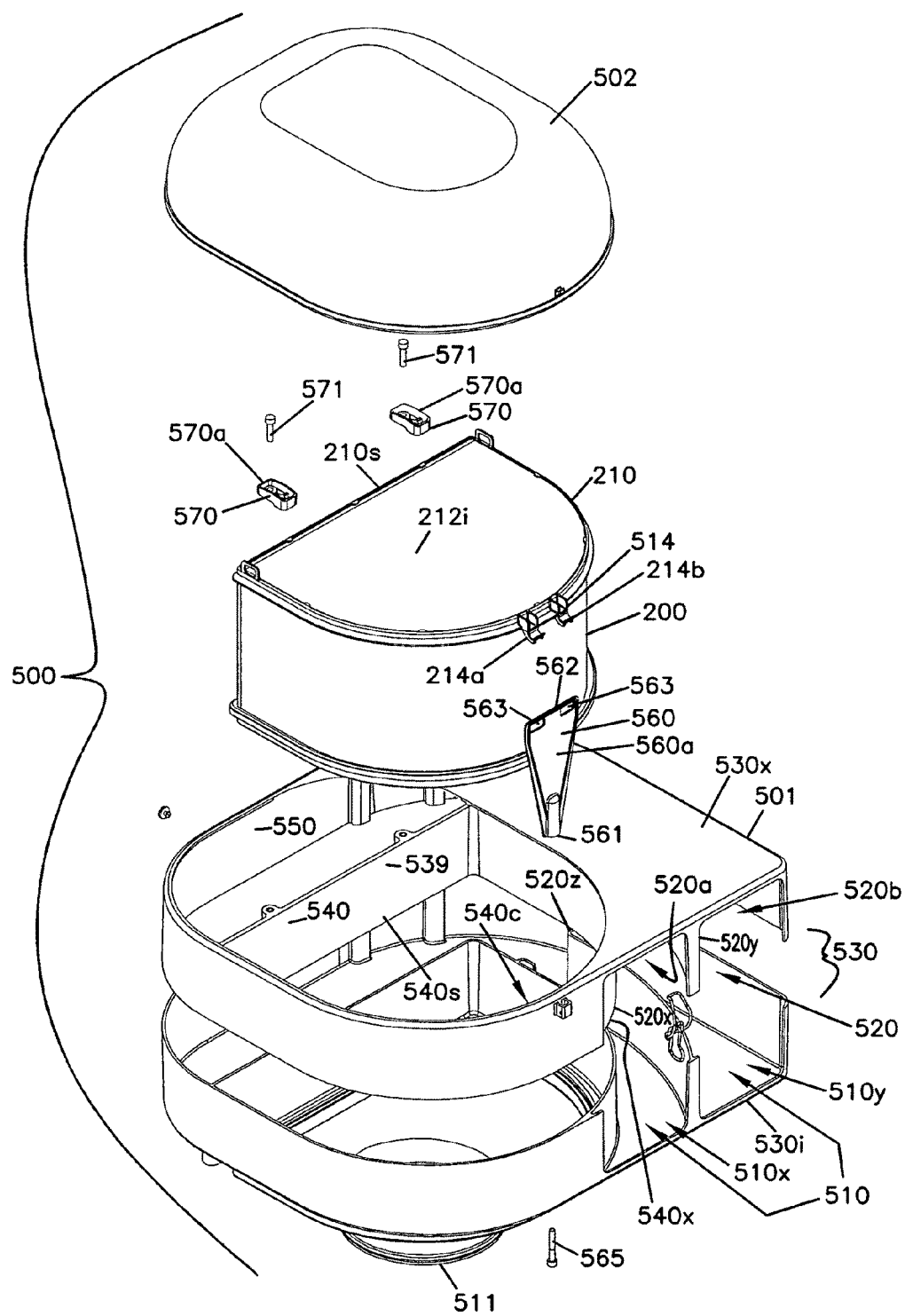
FIG. 23 is a schematic, exploded, perspective view of the air cleaner assembly of FIG. 20.

Attention is now directed to FIG. 23, an exploded perspective view of air cleaner assembly 500. Air cleaner assembly 500 includes a housing base or body 530, to which the access cover 502 is secured. For the example shown, the housing base 530 comprises two pieces or sections 530i, 530x. Piece or section 531i will sometimes be referred to herein as the "inner" or "back" piece or section, as it is the piece positioned against the engine cowl or cowling, during installation. Analogously, housing base piece or section 530x will sometimes be referred to herein as the "outer" or "front" piece or section, as this is the piece away from the engine cowl or cowling during installation.

Referring still to FIG. 23, the housing base 530 includes a D-shaped cartridge receiving section 539 surround by wall 540. Section 539 is sized and configured for receipt therein of cartridge 200. The D-shaped cartridge receiver 539 is defined by a wall 540 which has a straight side 540s and an opposite arch-shaped section 540c. It is noted that for particular housing body 530 depicted, wall 540 formed partly by section 530x and partly by section 530i.

The air flow inlet arrangement 510 directs air, at least in part, in an arch-shaped flow over an outside arch-shaped surface portion 540x of wall 540. This inlet flow is spaced from the cartridge 200 by wall 540. Air to be filtered will eventually flow into receiving space 550. From there is directed around (over in the orientation of FIG. 23) wall section 540s (in front section 530x) and into inlet surface 212i of cartridge 200. The air is then (with filtering flow) directed through cartridge 200, and outwardly through outlet 511.

Although alternatives are possible, typically the housing pieces 530i, 530x are molded pieces from plastic. The two pieces can be joined together with adhesive, sonic welding or fasteners, or various combinations thereof.

For the particular housing 500 depicted, the inlet arrangement 510 includes a water skimmer arrangement 520 including first and second arch-shaped water skimmer arrangements 520a, 520b. Each water skimmer arrangement 520a, 520b comprises a arch-shaped surface against which inlet flow is directed. Water will tend to collect on the arch-shaped surfaces 520x, 520y. The end of each arch-shaped surface is provided with a skimmer hook trough 520z. The hook troughs (discussed below) will tend to inhibit water collected along the surfaces 520x, 520y, from entering region 550. Rather, water will be drained through an aperture arrangement within housing 500, directed exteriorly of the assembly.

In general terms, the air flow inlet arrangement 510 comprises a plurality of inlet paths 510x, 510y, each having a water skimmer arrangement 520a, 520b associated therewith. Each of the inlet paths of 510x, 510y includes an arch-shaped section directing air into inlet area 550.

Still referring to FIG. 23, the cartridge 200 is secured in place by a fastening arrangement. A variety of fastening arrangements can be used. In the example shown, the fastening arrangement includes a first fastener 560, comprising a retainer 560a. The retainer 560a has a first bolt receiving end 561 and a second opposite end 562 with an aperture arrangement 563 (in this example comprising two apertures) therethrough. The aperture arrangement 563 is positioned to receive projection arrangement 514 therethrough. Once the projection arrangement 514 (hooks 514a, 514b) is projected through apertures 563 in fastener 560, bolt 565 can be tightened in its extension through housing body 530 and into fastener end 561, pulling and securing the cartridge 200 in place. This will help to retain the cartridge 200 in position and will also will help to ensure that seal member 215 is engaged against housing seal region 515, FIG. 22.

Referring to FIG. 23, it is noted that in order to loosen connect projection 514 of aperture 563, it will not typically be required that bolt 565 be completely removed. As a result of the hook shape in the example shown, projection 514, once bolt 565 is loosened, a disconnection through pivoting of the arches 200 will typically be possible.

Further sealing and securing pressure is provided by a retainer bracket arrangement 570 although alternatives are possible. Bracket arrangement 570 in this instance comprising two brackets 570a, is positioned in engagement with straight side 210s of ring 210. Brackets 500a are secured in place by receiving bolts 571. Together, brackets 570a and retainer 560 secure the cartridge 200 in position. Securing cartridge 200, then, is a matter of unhooking latch 503, FIG. 20, opening access cover 502 and unbolting bolts 571 and loosening bolt 565.

Figure 24:
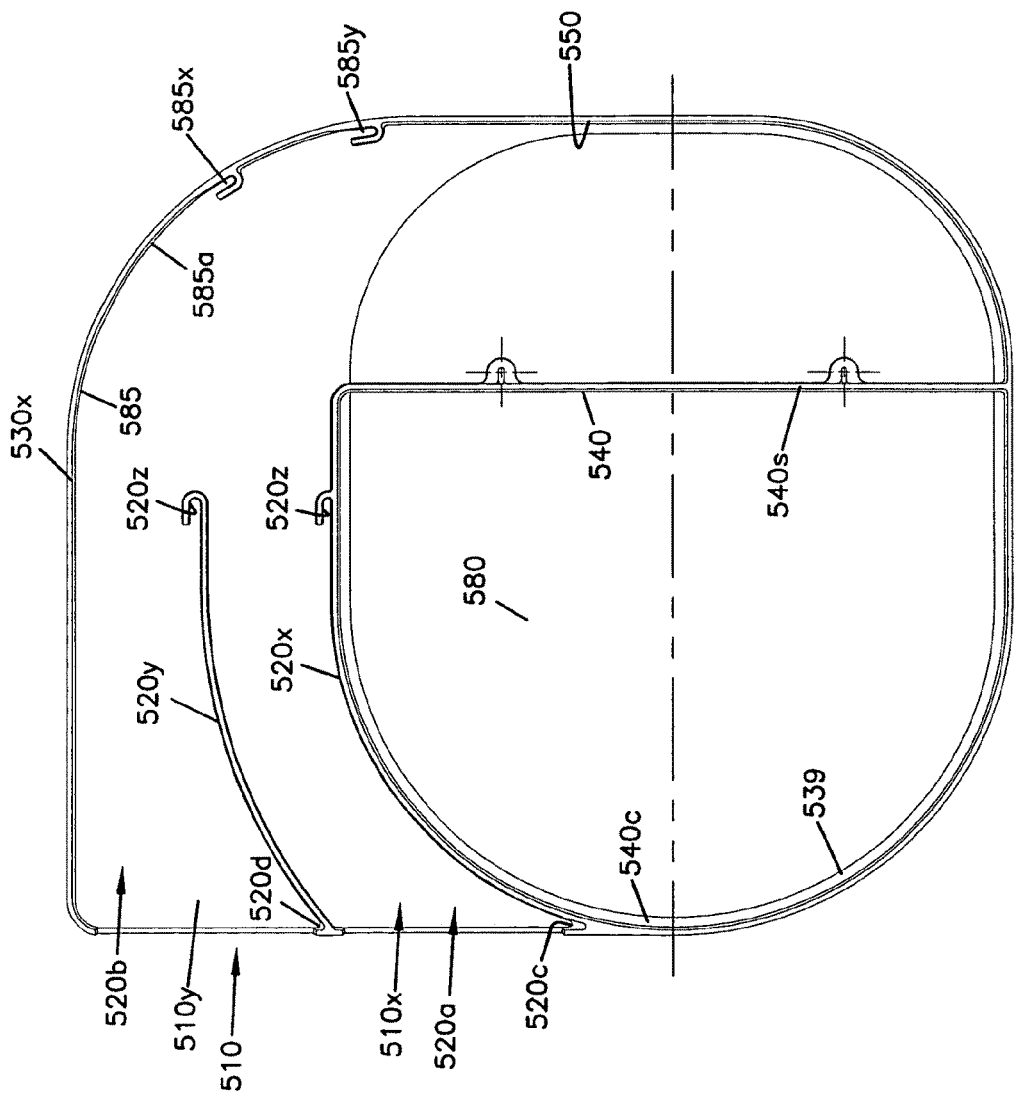
FIG. 24 is a schematic plan view of an inside surface of a outside housing body piece of the assembly of FIG. 20.

Attention is now directed to FIG. 24, in which housing outer or front section 530x is viewable, in a plan view directed toward an inner surface 580 thereof. Wall 540 comprising straight section 540s and opposite arched section 540c is viewable. Also viewable are water catcher hook troughs 520z, at ends of arch-shaped water skimmer sections 520x, 520y. In addition water catcher hook troughs 520c, 520d are viewable along the front edge of arch-shaped sections 520x, 520y respectively. It can be seen that as air flows into inlet arrangement 510, it will flow over (along) arch-shaped sections 520x, 520y, with water collecting thereagainst. The water will be inhibited from flowing to region 550 by catchers 520y 520z. In addition, upper surface 585 includes a downwardly arcing section 585a with hook trough water catchers 585x 585y thereon, to further inhibit water from flowing into region 550.

Figure 25:
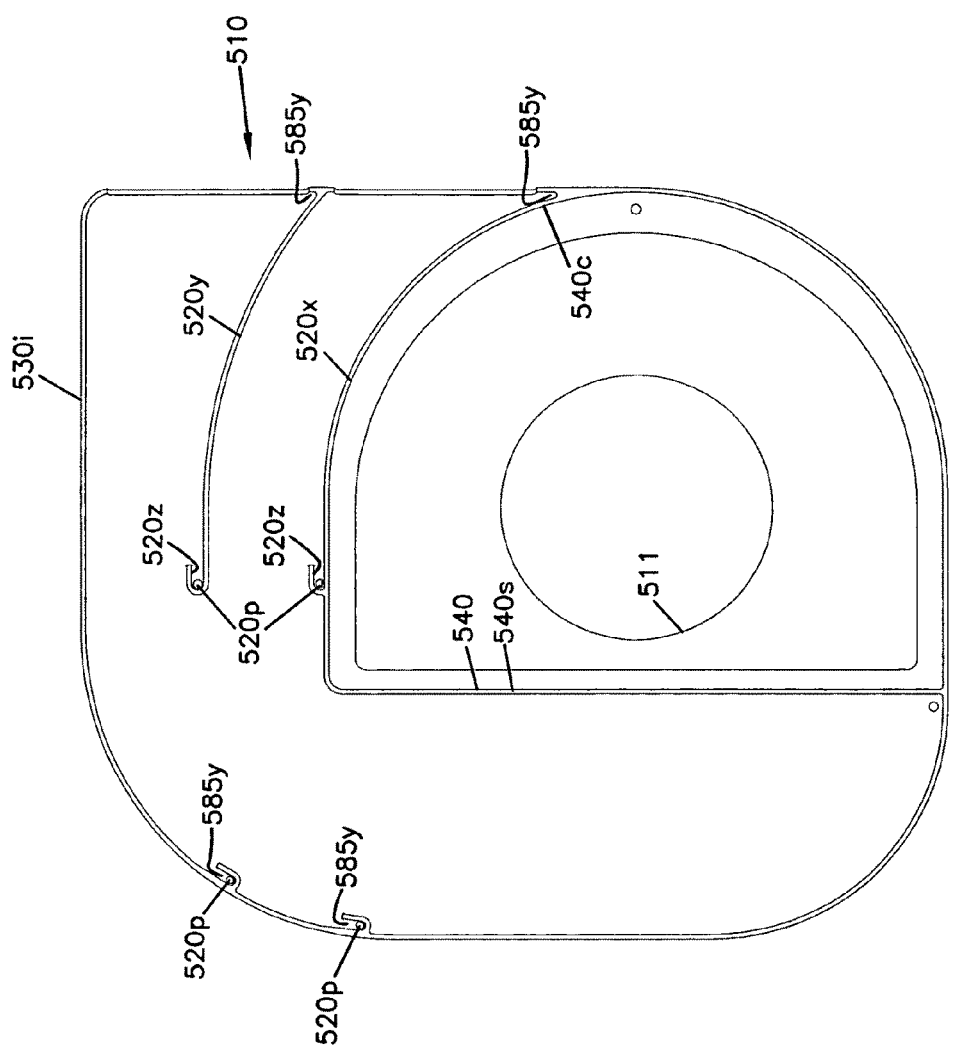
FIG. 25 is schematic plan view of an inside surface of inside housing body piece of the assembly of FIG. 20.

Attention is now directed to FIG. 25, in which a plan view is provided of housing base inner section 530i. Also, catchers 585y are viewable. Again, wall 540 is viewable comprising straight side 540s and opposite arch-shaped side 540c. Again, water skimmers 520x, 520y are shown with hook troughs 520z. Also, drain apertures 520p are viewable. Again, together, sections 530x and 530i form housing body 530, with the various surfaces engaging.

Figure 26:
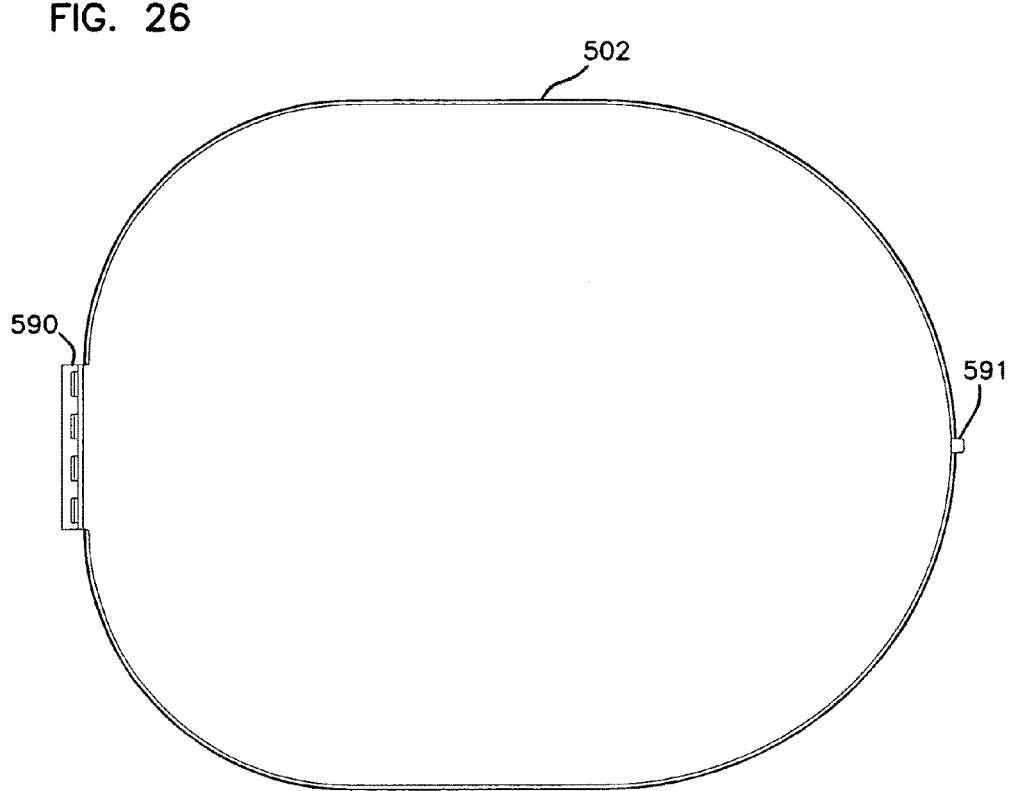
FIG. 26 is a schematic plan view of an access cover of the assembly of FIG. 16.

In FIG. 26, access cover 502 is viewable. Plate 590 can be used to engage a member on housing body or base 530, during installation. The access cover 502 can be configured to be completely removed during servicing, or to be pivoted out of the way during servicing, depending on the particular needs and desires for the operator. Still referring to FIG. 26, tab member 591 is provided, for engagement by latch or hook 503, FIG. 22.

Figure 27:
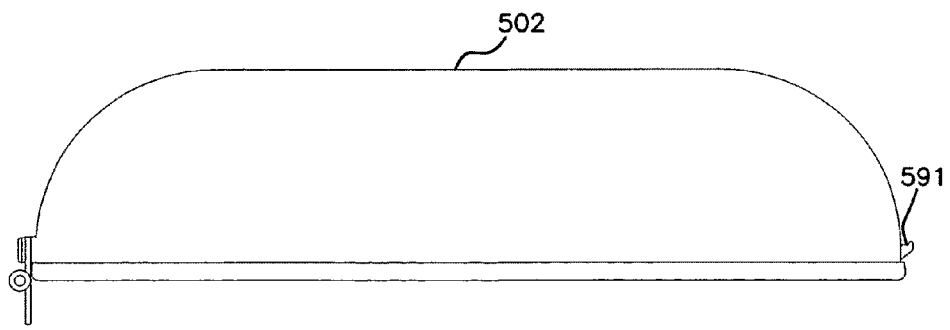
FIG. 27 is a schematic side elevational view of the access cover of FIG. 19.

In FIG. 27, side elevational view of access cover 502 is provided.

In FIG. 28, retainer member 560a is depicted in an enlarged view. Bolt receiving aperture 561 is viewable. In FIG. 29, an end view directed toward bolt receiving aperture 561 is shown.

Figure 30:
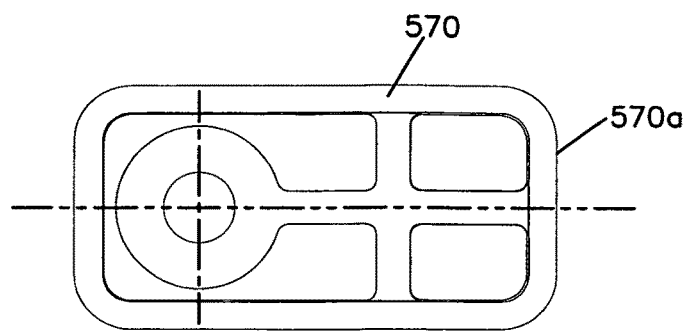
FIG. 30 is a schematic plan view of a retainer bracket of the assembly of FIG. 20.

In FIG. 30, a plan view of one of the brackets 570a is depicted.

Figure 31:
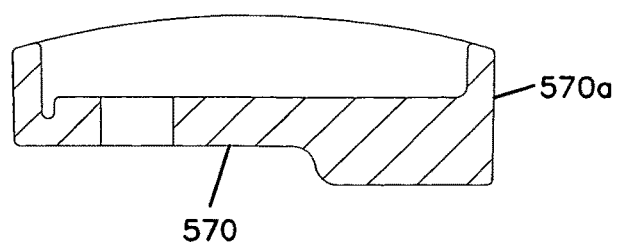
FIG. 31 is a schematic cross-sectional view of the bracket in FIG. 30.

In FIG. 31, a cross-sectional view of bracket 570a is viewable

An example polymeric material useable for housing the seal 515 and also for the side panel 142, as described herein, is polyurethane. An example of useable polyurethane is a foamed polyurethane. Preferred ones increase by volume during cure, and have an as-molded density of no greater than 30 lbs/cu·ft (0.48 g/cc), typically no greater than 22 lbs/cu·ft. (0.35 g/cc) and usually with in the range of 10 lbs/cu·ft (0.16 g/cc) to 22 lbs/cu·ft (0.35 g/cc); and, a hardness (Shore A) typically of not greater than 30, preferably not greater than 25 and typically within the range of 10 to 22. Of course polyurethanes outside of this range can be used, but the characterized ones are advantageous for manufacturing and handling. Also, non-polyurethane materials can be used.

V. Some General Comments

According to one aspect of the present disclosure, an air filter cartridge is provided. The air filter cartridge includes a media pack having first and second opposite flow faces. One of the flow faces is for air flow entry into the media pack and the opposite flow face is for filtered air to exit from the media pack. In an example depicted, the media pack comprises a plurality of arch-shaped strips of single facer media. The arch-shaped strips of single facer media are nested with one another to form a perimeter shape having a first, flat, side and an arched side opposite the first, flat, side. Each strip of single facer media typically comprises a strip of fluted media secured to a strip of facing media.

The media pack is closed to passage of unfiltered air therethrough. Sealing is generally provided by a single facer seal bead and an opposite stacking or winding bead, in typical applications.

A side panel is secured over the flat side of the media pack. The side panel, in typical applications, will comprise a molded-in-place panel, for example, a foamed polyurethane panel. The side panel can be molded completely over the flat side of the media pack, or partially over the flat side of the media pack, depending on the particular configuration and system involved.

In a typical arrangement, the media pack has a D-shaped perimeter with a central portion of the arched side of the media pack having a circular radius. The arched side can have opposite straight sections, adjacent the flat side and extending generally perpendicularly thereto.

In a typical cartridge, a housing seal arrangement is provided. In the example shown, although alternatives are possible, the housing seal arrangement includes a first support is mounted adjacent to, and, in an example shown surrounding, the first flow face, as a seal support. A housing seal member can be supported on the first support. When the first flow face is an outlet flow face from the media pack, the first support would typically include framework extending thereacross, to inhibit biasing in the media in a down flow direction and to provide structural support. The first support will typically have a perimeter definition of a D-shape, corresponding to the side wall definition of the media pack; i.e. having a straight side and an opposite arch-shaped side.

An example air cleaner cartridge described and shown herein, includes a bracket support, in an example shown in the form of a ring, positioned adjacent to and surrounding the second flow face. An example bracket support depicted includes an arch-shaped section and an opposite straight section, i.e. a D-shape. An example arch-shaped section has a projection arrangement thereon. In an example depicted, the projection arrangement includes a hook arrangement comprising a pair of spaced, hinge, hooks. In general terms, the bracket support includes a projection arrangement thereon, which provides for engagement of the bracket or retainer member within an air cleaner housing, in use.

In an example depicted, the bracket support includes a handle arrangement thereon. A particular example handle arrangement, is depicted, comprising a pair of opposite handle projections, each having a handle aperture projecting therethrough. The handle projections, in an example shown, are mounted on the arched portion of the bracket support ring perimeter definition, adjacent the straight section and projecting away from the media pack.

Also according to the present disclosure, an air cleaner assembly is provided. The air cleaner assembly includes a housing comprising a housing body and an access cover. The housing body includes an air flow inlet arrangement and air flow outlet arrangement. In an example depicted, the air flow inlet arrangement is oriented to receive air in a flow path generally orthogonal to the flow path air through the air flow outlet arrangement.

A filter cartridge is removably secured within the housing body. The filter cartridge generally is in accord with cartridge descriptions herein, and typically has a perimeter definition with a straight side and an arch-shaped side in a D-shape. The filter cartridge typically includes a media pack comprising a z-filter construction as described herein.

The housing body includes a housing inner wall surrounding the perimeter of the media pack in the cartridge. The air flow inlet arrangement is configured to direct inlet air over at least a portion of the arch-shaped side of the media pack, with a housing wall separating the filter cartridge from the air flow inlet arrangement.

In an example depicted, the air flow inlet arrangement comprises a plurality of inlet channels. In a specific arrangement depicted, it comprises two inlet channels.

The air flow inlet arrangement depicted includes a water skimmer arrangement therein. The water skimmer arrangement comprises a plurality of water skimmer or catcher hook troughs, oriented and configured to collect water from the air flow inlet arrangement.

In an example arrangement, the filter cartridge is configured with a first support as previously described, mounted adjacent to and surrounding the first flow face, and including a housing seal member thereon. The cartridge is positioned within the housing, with the housing seal member secured against a housing seal region of the housing at a location generally surrounding the air flow outlet arrangement.

In addition, in a typical arrangement, the filter cartridge includes a bracket support as characterized. The air cleaner includes a retainer member engaging the bracket support and secured to the housing body. A method of engagement is described as providing the bracket support with projection arrangement thereon, for example, in the form of a hook arrangement; and, providing the retainer member with aperture arrangement therethrough, in engagement with the hook arrangement.

In addition, a retaining arrangement is described in which the housing includes a retainer bracket arrangement positioned to press against the straight side of the bracket support, generally in a direction corresponding to a direction of air flow through the media pack from one flow face to other. In an example depicted, the bracket arrangement comprises a plurality for example two spaced bracket members, separately attached to the housing.

Also described herein is a method of assembling an filter cartridge. The method generally includes a step of coiling a strip of filter media to a coiled media pack having first and second opposite flow faces with flutes extending therebetween. The strip of filter media which is coiled, is typically a sheet of fluted media secured to facing media. The step of coiling can include providing a winding (seal) bead within the coil, generally at an opposite side of the strip of facer media from a single facer (seal) bead.

After the step of coiling, the coiled media pack is cut to form a cut media pack section having a perimeter shape with a cut side and an opposite arch-shaped side. A side panel is positioned over at least a selected portion of the cut side to form a media pack having a side panel.

The media pack having a side panel is then incorporated into a filter cartridge. The step of incorporating can include, for example, attaching a support to the media pack at a location adjacent to the first flow face and providing a seal member on the perimeter support ring. In more general terms, the step of incorporating the media pack into a filter cartridge comprises attaching a housing seal support to the media pack and providing a housing seal member on the housing support. Although alternatives are possible, in an example arrangement described, the housing seal member is attached to the support member, before the support member, (in an example, in the form of a perimeter support ring), is attached to the media pack.

For an example described herein, the method of incorporating the media pack into the filter cartridge also includes a step of incorporating a bracket support to the media pack at a location adjacent to a second flow face.

In still another aspect of the present disclosure, an air filter cartridge is provided which includes a media pack comprising strips of single facer and having a perimeter shape with a straight side and opposite arch-shaped side; i.e. a D-shape. In general, the single facer strips each comprise fluted media secured to facing media.

In an example described, the arch-shaped side has a central section with a circular radius and includes opposite straight sections adjacent opposite ends of the straight side.

It is noted that the principles described herein can be applied in a variety of specific forms. There is no specific requirement that an arrangement include all the features characterized herein, in order to obtain some benefit of the present disclosure.

What is claimed is:

1. An air filter cartridge comprising:
(a) a media pack comprising strips of single facer media comprising fluted media secured to facing media and having a perimeter shape with a straight side and an arch-shaped side opposite the straight side.

2. An air filter cartridge comprising:
(a) a media pack having first and second, opposite, flow faces; the media pack comprising a plurality of arch-shaped strips of media nested within one another to form a perimeter shape with: a first, flat, side; and, an arch-shaped side opposite the first flat side;
   (i) each strip of the plurality of arch-shaped strips of media comprising a strip of fluted media secured to a strip of facing media; and,
   (ii) the media pack being closed to passage of unfiltered air therethrough; and,
(b) a side panel positioned on the first flat side of the media pack.

3. An air filter cartridge according to claim 2 including:
(a) a first seal support mounted adjacent to the first flow face.

4. An air filter cartridge according to claim 3 wherein:
(a) the first seal support has a perimeter support ring surrounding the media pack and having a media support framework extending thereacross.

5. An air filter cartridge according to claim 4 wherein:
(a) the first perimeter support ring includes a housing seal member thereon.

6. An air filter cartridge according to claim 2 including:
(a) a bracket support positioned adjacent to the second flow face.

7. An air filter cartridge according to claim 6 wherein:
(a) the bracket support has a ring surrounding the media pack including an arch-shaped section with a projection arrangement thereon.

8. An air filter cartridge according to claim 7 wherein:
(a) the projection arrangement comprises a hook arrangement.

9. An air filter cartridge according to claim 6 wherein:
(a) the bracket support includes a handle arrangement thereon comprising at least two handle members on the arch-shaped section projecting away from the media pack.

10. An air filter cartridge according to claim 2 wherein:
(a) the side panel is a molded-in-place side panel.

11. An air cleaner assembly comprising:
(a) a housing comprising housing body and an access cover;
   (i) the housing body including an air flow inlet arrangement and an air flow outlet arrangement; and,
(b) a filter cartridge removably secured within the housing body; the filter cartridge comprising:
   (i) a media pack having first and second, opposite, flow faces; the media pack comprising a plurality of strips of media forming a perimeter shape with: a first, flat, side; and, an arch-shaped side opposite the first flat side;
      (A) each strip of the plurality of strips of media comprising a strip of fluted media secured to a strip of facing media; and,
      (B) the media pack being closed to passage of unfiltered air therethrough; and,
   (ii) a side panel positioned on the first flat side of the media pack.

12. An air cleaner assembly according to claim 11 wherein:
(a) the housing body comprises a D-shaped housing wall surrounding the perimeter of the media pack; and,
(b) the air flow inlet arrangement is configured to direct inlet air along at least a portion of an arch-shaped side of the media pack, with the housing inner wall separating the filter cartridge from the air flow inlet arrangement.

13. An air cleaner assembly according to claim 12 wherein:
(a) the air flow inlet arrangement comprises a plurality of inlet channels.

14. An air cleaner assembly according to claim 13 wherein:
(a) the air flow inlet arrangement includes a water skimmer arrangement comprising a plurality of water skimmer hook troughs.

15. An air cleaner assembly according to claim 11 wherein:
(a) the housing body is configured with the air flow inlet arrangement directed generally orthogonal to the air flow outlet arrangement.

16. An air cleaner assembly according to claim 11 wherein:
(a) the media pack includes a first support mounted adjacent to, the first flow face;
   (i) the first support including a housing seal member thereon; and,
(b) the housing includes a housing seal region therein, surrounding the air flow outlet arrangement;
   (i) the filter cartridge being positioned with the seal member sealed to the housing seal region.

17. An air cleaner assembly according to claim 11 wherein:
(a) the filter cartridge includes a bracket support positioned adjacent to the second flow face.

18. An air cleaner assembly according to claim 14 wherein:
(a) the bracket support includes a projection arrangement thereon, and
(b) the housing includes a retainer member having first and second ends;
   (i) the first end of the retainer member including an aperture arrangement therein with the projection arrangement on the bracket support ring projecting therethrough; and,
   (ii) the second end of the retainer member being secured to the housing body.

19. A method of assembling an air filter cartridge; the method including steps of:
(a) coiling a strip of filter media to form a coiled media pack having first and second, opposite, flow faces;
   (i) the strip of filter media comprising a sheet of fluted media secured to facing media;
(b) cutting the coiled media pack to form a cut media pack section having a perimeter shape with a cut side and an opposite arch-shaped side;
(c) positioning a side panel over at least a portion of the cut side to form a media pack having a side panel; and,
(d) incorporating the media pack having a the side panel into a filter cartridge.

20. A method according to claim 19 wherein:
(a) the step of incorporating the media pack having a side panel into a filter cartridge includes a step of attaching a seal support having a seal member to the media pack at a location adjacent to the first flow face.

* * * * *